US011448933B2

(12) United States Patent
Kakinoki et al.

(10) Patent No.: US 11,448,933 B2
(45) Date of Patent: Sep. 20, 2022

(54) DISPLAY DEVICE

(71) Applicant: Japan Display Inc., Tokyo (JP)

(72) Inventors: Yuto Kakinoki, Tokyo (JP); Naoki Takada, Tokyo (JP); Takayuki Nakanishi, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 17/347,588

(22) Filed: Jun. 15, 2021

(65) Prior Publication Data

US 2021/0302797 A1    Sep. 30, 2021

Related U.S. Application Data

(63) Continuation of application No. PCT/JP2019/033797, filed on Aug. 28, 2019.

(30) Foreign Application Priority Data

Dec. 19, 2018   (JP) .............................. JP2018-237800

(51) Int. Cl.
   *G02F 1/1362*   (2006.01)
   *G01L 1/14*   (2006.01)

(52) U.S. Cl.
   CPC .......... *G02F 1/136286* (2013.01); *G01L 1/14* (2013.01)

(58) Field of Classification Search
   CPC ............................................... G02F 1/136286
   See application file for complete search history.

(56) References Cited

U.S. PATENT DOCUMENTS

| 2009/0153046 | A1* | 6/2009 | Hayashi | ............ | H01L 51/5234 |
| | | | | | 313/505 |
| 2017/0031479 | A1* | 2/2017 | Kim | ...................... | G06F 3/0412 |
| 2017/0262112 | A1* | 9/2017 | Noguchi | ............ | G02F 1/13338 |
| 2018/0164923 | A1* | 6/2018 | Hirabayashi | ...... | G02F 1/133308 |

FOREIGN PATENT DOCUMENTS

| JP | 2017-162173 A | 9/2017 |
| JP | 2018-88255 A | 6/2018 |

OTHER PUBLICATIONS

International Search Report and Written Opinion dated Nov. 12, 2019, received for PCT Application PCT/JP2019/033797, Filed on Aug. 28, 2019, 10 pages including English Translation.

\* cited by examiner

*Primary Examiner* — Sang V Nguyen
(74) *Attorney, Agent, or Firm* — Xsensus LLP

(57) ABSTRACT

According to an aspect, a display device includes: a display region in which a plurality of pixels are arrayed in a row direction and a column direction; a plurality of gate lines extending in the row direction and coupled to the pixels; a plurality of signal lines extending in the column direction and coupled to the pixels; a plurality of pixel electrodes provided in the pixels; a plurality of first electrodes facing the pixel electrodes; a plurality of auxiliary wiring lines coupled to the respective first electrodes; a second electrode provided in the same layer as the auxiliary wiring lines and overlapping with the signal lines; and a detection circuit configured to detect force applied to the display region based on at least first capacitance generated between the second electrode and the signal lines.

7 Claims, 26 Drawing Sheets

FIG.5A
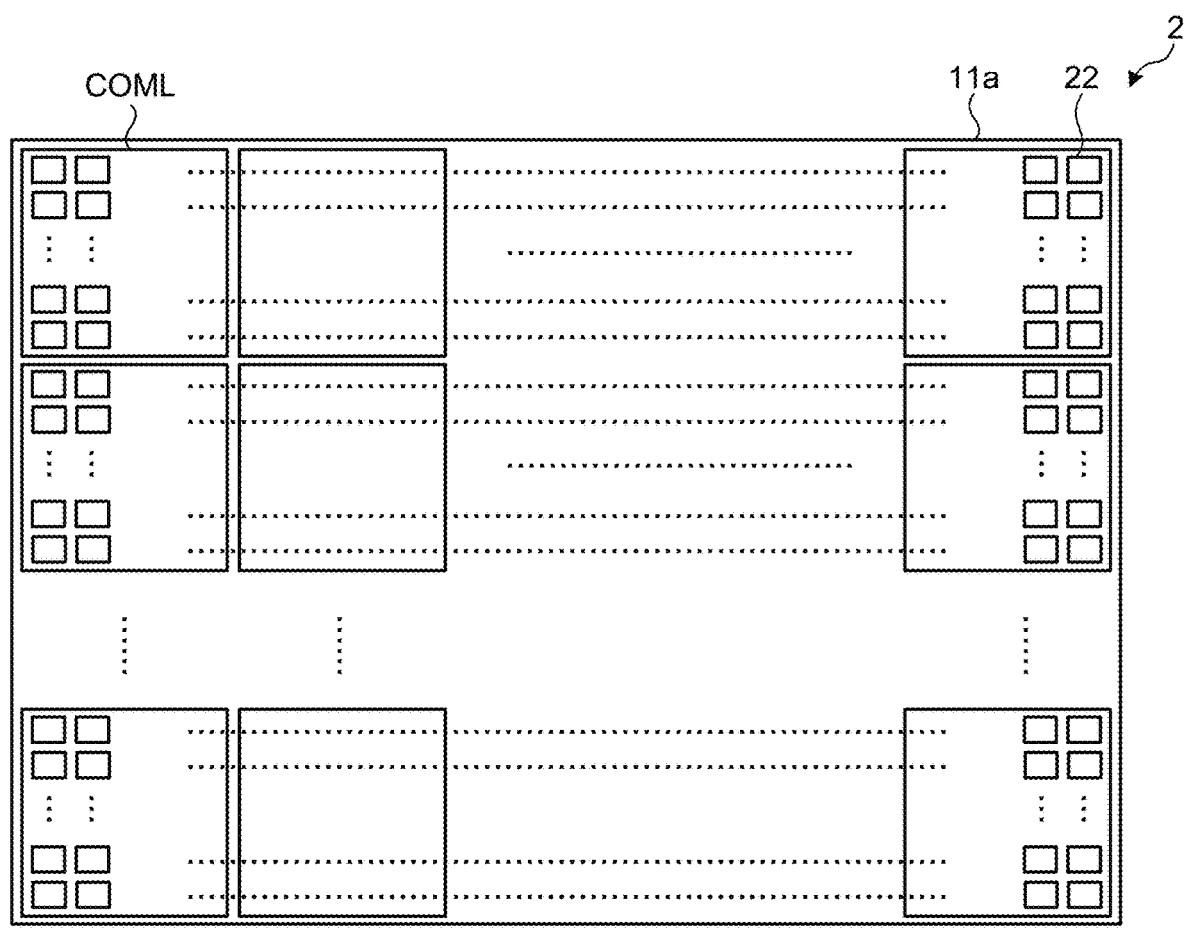
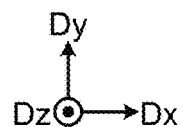

DISPLAY DEVICE

CROSS-REFERENCE TO RELATED APPLICATIONS

This application is a continuation of PCT Application No. PCT/JP2019/033797, filed Aug. 28, 2019, and based upon and claiming the benefit of priority from Japanese Patent Application No. 2018-237800, filed Dec. 19, 2018, the entire contents of all of which are incorporated herein by reference.

BACKGROUND

1. Technical Field

What is disclosed herein relates to a display device.

2. Description of the Related Art

In recent years, touch detection devices capable of detecting an external proximity object, which are what is called touchscreen panels, have attracted attentions. The touchscreen panels are mounted on or integrated with display devices such as liquid crystal display devices and used as display devices. Force detection devices capable of detecting force applied to display surfaces of the display devices in addition to detecting a touch have also been used. For example, a configuration has been known in which the force is detected based on the amount of change in capacitance with change in a distance between a detection electrode and a reference potential layer (for example, see Japanese Patent Application Laid-open Publication No. 2018-88255).

It is disclosed that the above-mentioned conventional technique has a configuration in which a backlight unit is provided between the detection electrode and the reference potential layer. In such a configuration, when, for example, a direct-type backlight unit is used, the distance between the detection electrode and the reference potential layer is increased to lower the capacitance, and thus the amount of change in the capacitance cannot possibly be detected. When the force applied to the display surface of the display device is detected, a layer for providing an electrode for force detection needs to be provided in a display panel, which can increase cost due to increase in the number of processes.

For the foregoing reasons, there is a need for a display device that can provide a configuration detecting force applied to a display surface at low cost.

SUMMARY

According to an aspect, a display device includes: a display region in which a plurality of pixels are arrayed in a row direction and a column direction; a plurality of gate lines extending in the row direction and coupled to the pixels; a plurality of signal lines extending in the column direction and coupled to the pixels; a plurality of pixel electrodes provided in the pixels; a plurality of first electrodes facing the pixel electrodes; a plurality of auxiliary wiring lines coupled to the respective first electrodes; a second electrode provided in the same layer as the auxiliary wiring lines and overlapping with the signal lines; and a detection circuit configured to detect force applied to the display region based on at least first capacitance generated between the second electrode and the signal lines.

According to an aspect, a display device includes: a display region in which a plurality of pixels are arrayed in a row direction and a column direction; a plurality of gate lines extending in the row direction and coupled to the pixels; a plurality of signal lines extending in the column direction and coupled to the pixels; a plurality of pixel electrodes provided in the pixels; a plurality of first electrodes facing the pixel electrodes; a plurality of auxiliary wiring lines coupled to the respective first electrodes; a second electrode provided in the same layer as the signal lines and overlapping with the gate lines; and a detection circuit configured to detect force applied to the display region based on at least first capacitance generated between the second electrode and the gate lines.

According to an aspect, a display device includes: a display region in which a plurality of pixels are arrayed in a row direction and a column direction; a plurality of gate lines extending in the row direction and coupled to the pixels; a plurality of signal lines extending in the column direction and coupled to the pixels; a plurality of pixel electrodes provided in the pixels; a plurality of first electrodes facing the pixel electrodes; a plurality of auxiliary wiring lines coupled to the respective first electrodes; a second electrode provided in a frame region outside the display region; a first reference electrode provided in the frame region and arranged so as to face one surface of the second electrode; and a detection circuit that detects force applied to the display region based on at least first capacitance generated between the second electrode and the first reference electrode.

BRIEF DESCRIPTION OF THE DRAWINGS

FIG. 5A is a plan view of a first example that schematically illustrates a TFT substrate included in the display device in the first embodiment;

DETAILED DESCRIPTION

Figure 1:
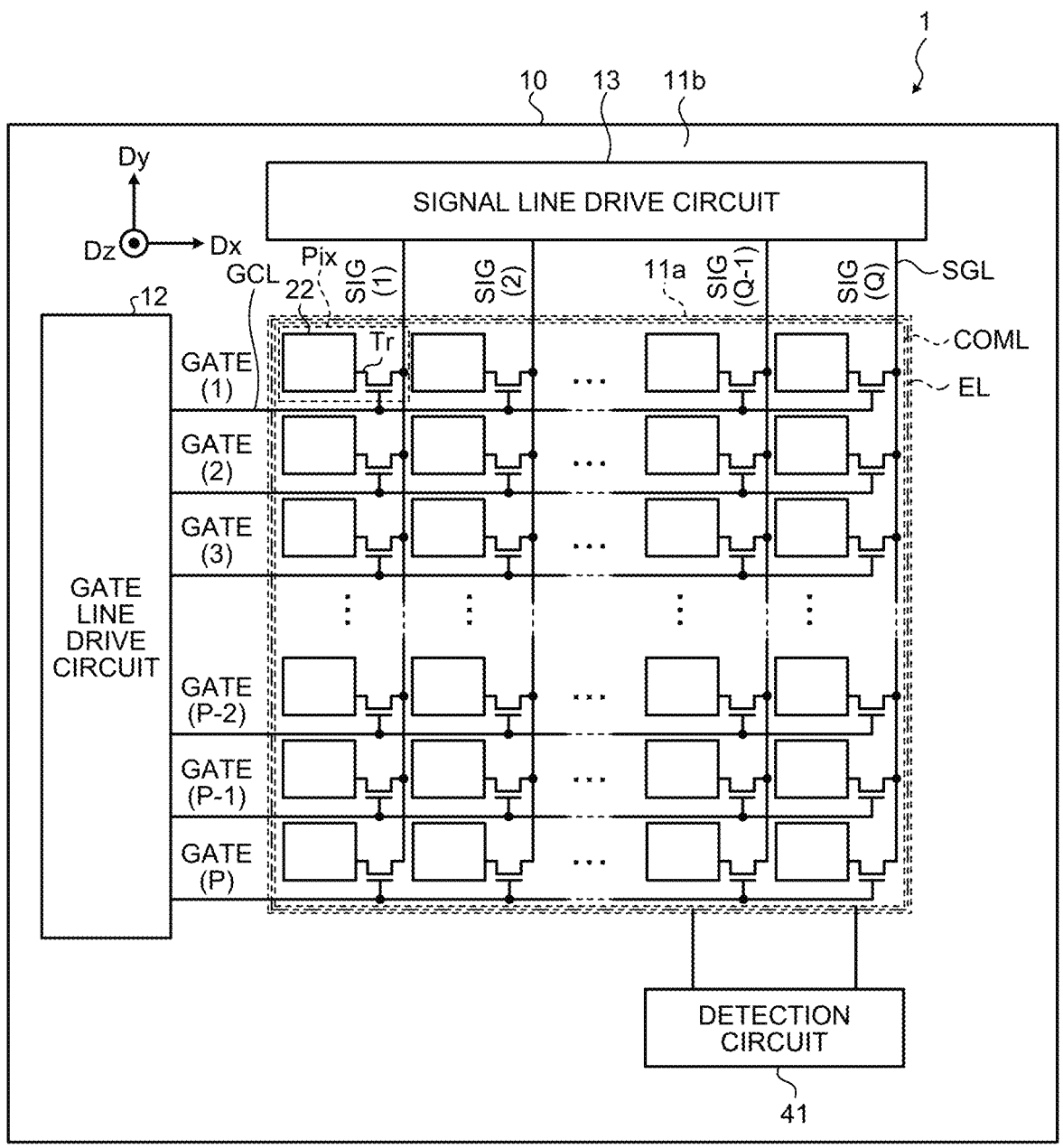
FIG. 1 is a block diagram illustrating an example of the configuration of a display device according to a first embodiment.

Modes for carrying out the present disclosure (embodiments) will be described in detail with reference to the drawings. Contents described in the following embodiments do not limit the present disclosure. Components described below include those that can be easily assumed by those skilled in the art and substantially the same components. Furthermore, the components described below can be appropriately combined. What is disclosed herein is merely an example, and it is needless to say that appropriate modifications within the gist of the disclosure at which those skilled in the art can easily arrive are encompassed in the range of the present disclosure. In the drawings, widths, thicknesses, shapes, and the like of the components can be schematically illustrated in comparison with actual modes for clearer explanation. They are, however, merely examples and do not limit interpretation of the present disclosure. In the present specification and the drawings, the same reference signs denote components identical to those described before with reference to the drawing that has already been referred, and detail explanation thereof can be appropriately omitted.

In this disclosure, when an element is described as being "on" another element, the element can be directly on the other element, or there can be one or more elements between the element and the other element.

First Embodiment

FIG. 1 is a block diagram illustrating an example of the configuration of a display device according to a first embodiment. As illustrated in FIG. 1, a display device 1 includes a display panel 10 on which a display region 11a for displaying an image, a gate line drive circuit 12, a signal line drive circuit 13, and a detection circuit 41 are provided.

The display panel 10 is what is called an in-cell-type device in which a capacitive touch sensor is integrated in the display region 11a. Incorporation and integration of the capacitive touch sensor in the display panel 10 means that some members such as a substrate and an electrode in the display region 11a are used also as some members such as a substrate and an electrode to be used as the touch sensor, for example.

A plurality of pixels Pix arrayed in a row direction (Dx direction) and a column direction (Dy direction) are provided in the display region 11a. Although FIG. 1 illustrates some pixels Pix, the pixels Pix are arranged over the entire area of the display region 11a. The configuration using a liquid crystal display element as a display element is exemplified in the embodiment, but the mode of the display element does not limit the present disclosure.

Each pixel Pix includes a pixel electrode 22 and a pixel transistor Tr. The pixel transistor Tr is formed with a thin film transistor and is configured with, for example, an n-channel metal oxide semiconductor (MOS) TFT. The source of the pixel transistor Tr is coupled to a corresponding one of signal lines SGL, the gate thereof is coupled to a corresponding one of gate lines GCL, and the drain thereof is coupled to the pixel electrode 22.

The pixel Pix is coupled to other pixels Pix by the gate line GCL extending in the row direction (Dx direction). The gate lines GCL are coupled to the gate line drive circuit 12 and supplied with gate signals GATE(1, 2, . . . , and P) from the gate line drive circuit 12.

The pixel Pix is coupled to other pixels Pix by the signal line SGL extending in the column direction (Dy direction). The signal lines SGL are coupled to the signal line drive circuit 13 and supplied with pixel signals SIG(1, 2, . . . , and Q) from the signal line drive circuit 13.

The gate line drive circuit 12 supplies the gate signals GATE(1, 2, . . . , and P) to the gates of the pixel transistors Tr of the pixels Pix of first, second, . . . , and P-th rows through the gate lines GCL. The gate line drive circuit 12 has a function of supplying a fixed potential Vfix to the gate lines GCL. The fixed potential Vfix may be, for example, a GND potential.

The signal line drive circuit 13 supplies the pixel signals SIG(1, 2, . . . , and Q) to the sources of the pixel transistors Tr of the pixels Pix through the signal lines SGL. The signal line drive circuit 13 supplies the pixel signals SIG(1, 2, . . . , and Q) to the pixels Pix of first, second, . . . , and P-th rows simultaneously. The signal line drive circuit 13 has a function of supplying the fixed potential Vfix to the signal lines SGL.

The detection circuit 41 has, as operation modes in the display device 1, a display mode in which an image is displayed in the display region 11a and two detection modes: a touch detection mode and a force detection mode. The touch detection means detection of a position and/or a motion of a detection target in a state in which the detection target is in contact with the display surface or is so close to the display surface that the target can be regarded as being in contact with the surface (hereinafter, also referred to as a "touch detection state" in some cases) in the present disclosure. The force detection means further detection of force applied to the display surface by the detection target in a state in which the detection target is in contact with the display surface.

One or more first electrodes COML are provided in the display region 11a. The one or more first electrodes COML are provided in a region illustrated by a dashed line, the region overlapping with the display region 11a when viewed in the direction (Dz direction) orthogonal to the row direction (Dx direction) and the column direction (Dy direction).

Second electrodes EL for detecting the force applied to the display surface are provided in the display region 11a. The second electrodes EL are provided in a region illustrated by a dashed-dotted line, the region overlapping with the display region 11a when viewed in the direction (Dz direction) orthogonal to the row direction (Dx direction) and the column direction (Dy direction).

The detection circuit 41 supplies various signals or potentials to the one or more first electrodes COML and the second electrodes EL in accordance with the operation modes.

When the image display is performed in the display region 11a, the detection circuit 41 supplies, to the first electrodes COML, a common potential Vcomdc for the pixel electrodes 22. The first electrodes COML thereby function as common electrodes for the pixel electrodes 22 when the image display is performed in the display region 11a.

When the touch detection is performed, the detection circuit 41 supplies a touch detection signal Vcom to the first electrodes COML. The first electrodes COML thereby function as sensor electrodes when the touch detection is performed.

When the force detection is performed, the detection circuit 41 supplies a force detection signal Vfd to the second electrodes EL. The second electrodes EL thereby function as sensor electrodes when the force detection is performed.

The detection circuit 41 has a function of supplying the fixed potential Vfix and a guard signal Vgd to the first electrodes COML. The detection circuit 41 also has a function of supplying the fixed potential Vfix and the guard signal Vgd to the second electrodes EL. The touch detection signal Vcom, the force detection signal Vfd, and the guard signal Vgd have the same waveform and are synchronized with one another in the embodiment.

The gate line drive circuit 12, the signal line drive circuit 13, and the detection circuit 41 may be configured with individual devices (IC) or may be configured with one or a plurality of devices (ICs) having the above-mentioned functions integrated therein. The configurations of the gate line drive circuit 12, the signal line drive circuit 13, and the detection circuit 41 do not limit the present disclosure.

Figure 2:
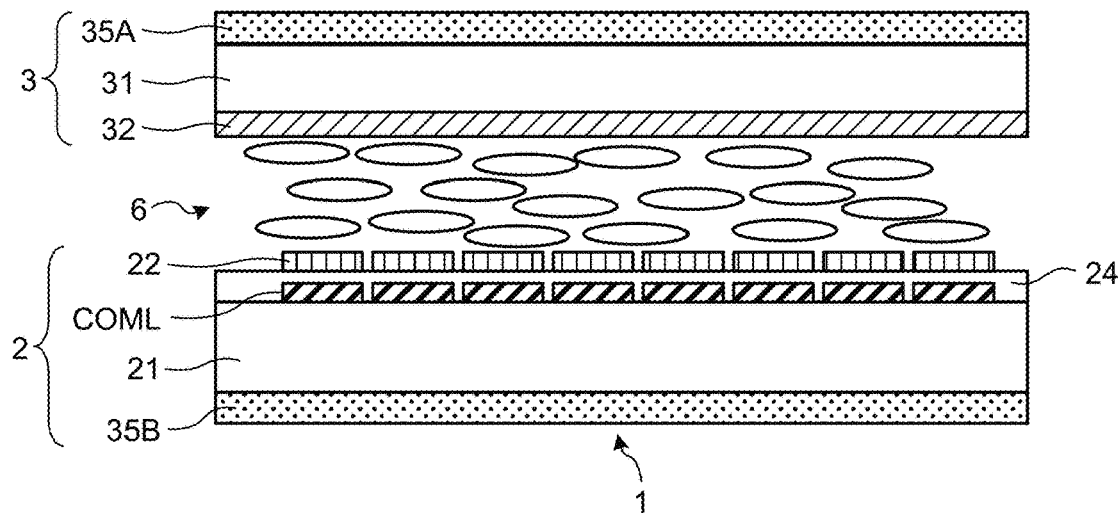
FIG. 2 is a cross-sectional view illustrating the schematic cross-sectional configuration of the display device.
Figure 3:
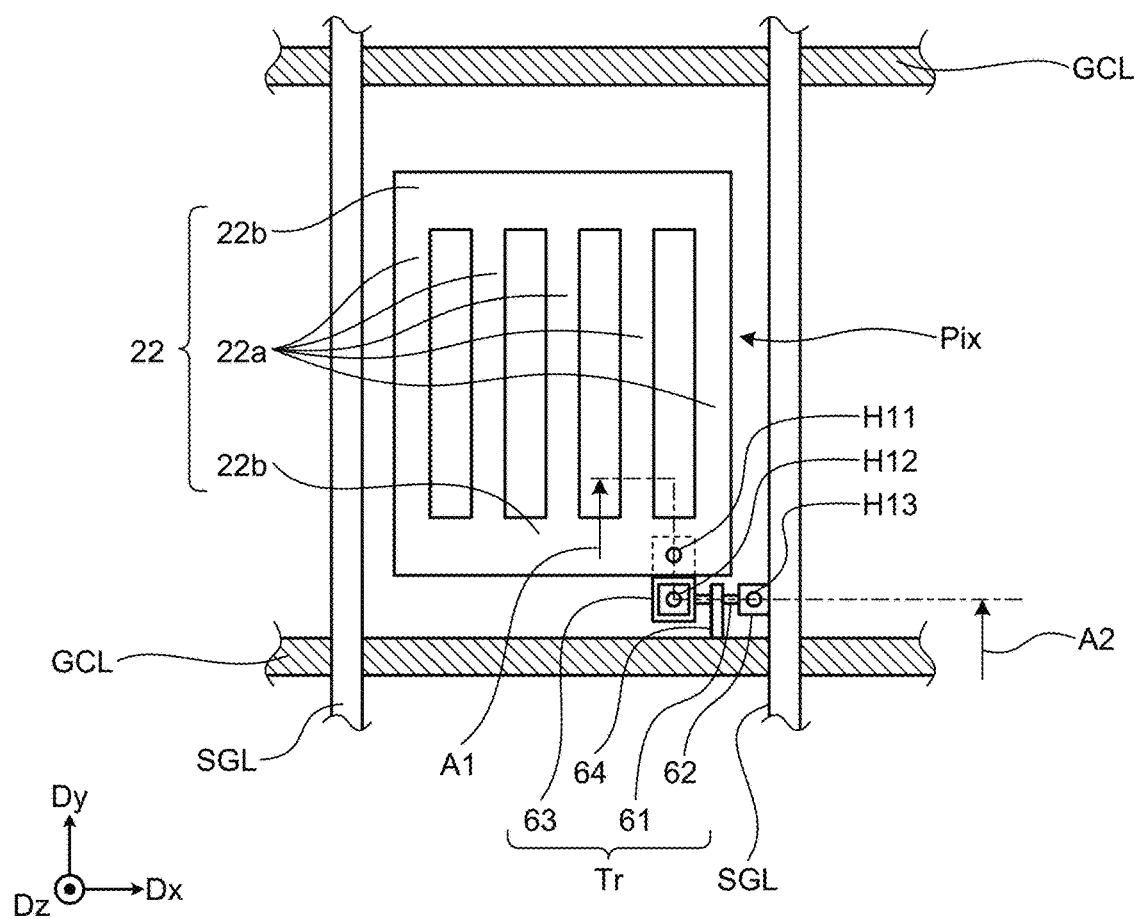
FIG. 3 is a plan view illustrating an example of the configuration of a pixel.
Figure 4:
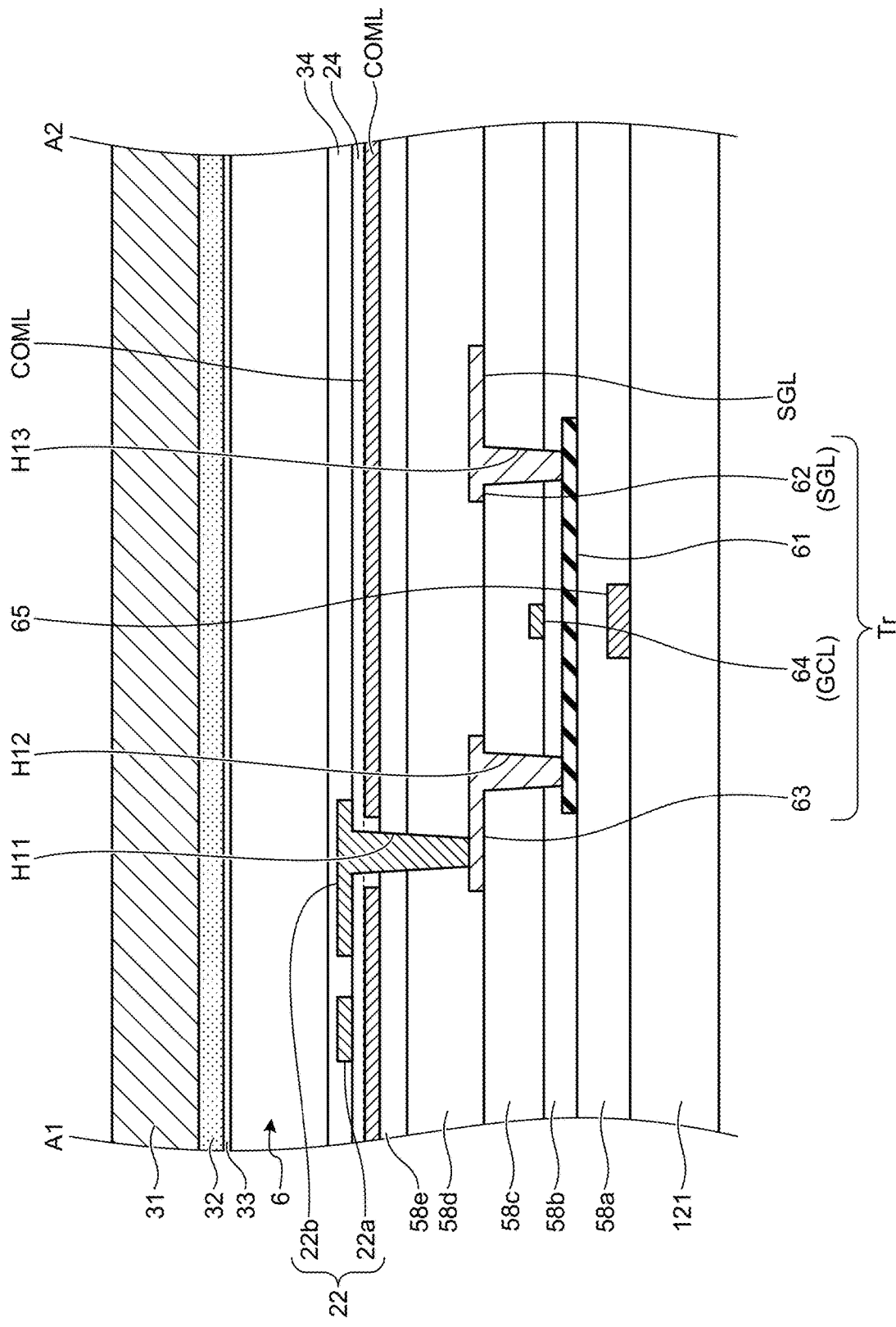
FIG. 4 is a cross-sectional view cut along line A1-A2 in FIG. 3.
Figure 5B:
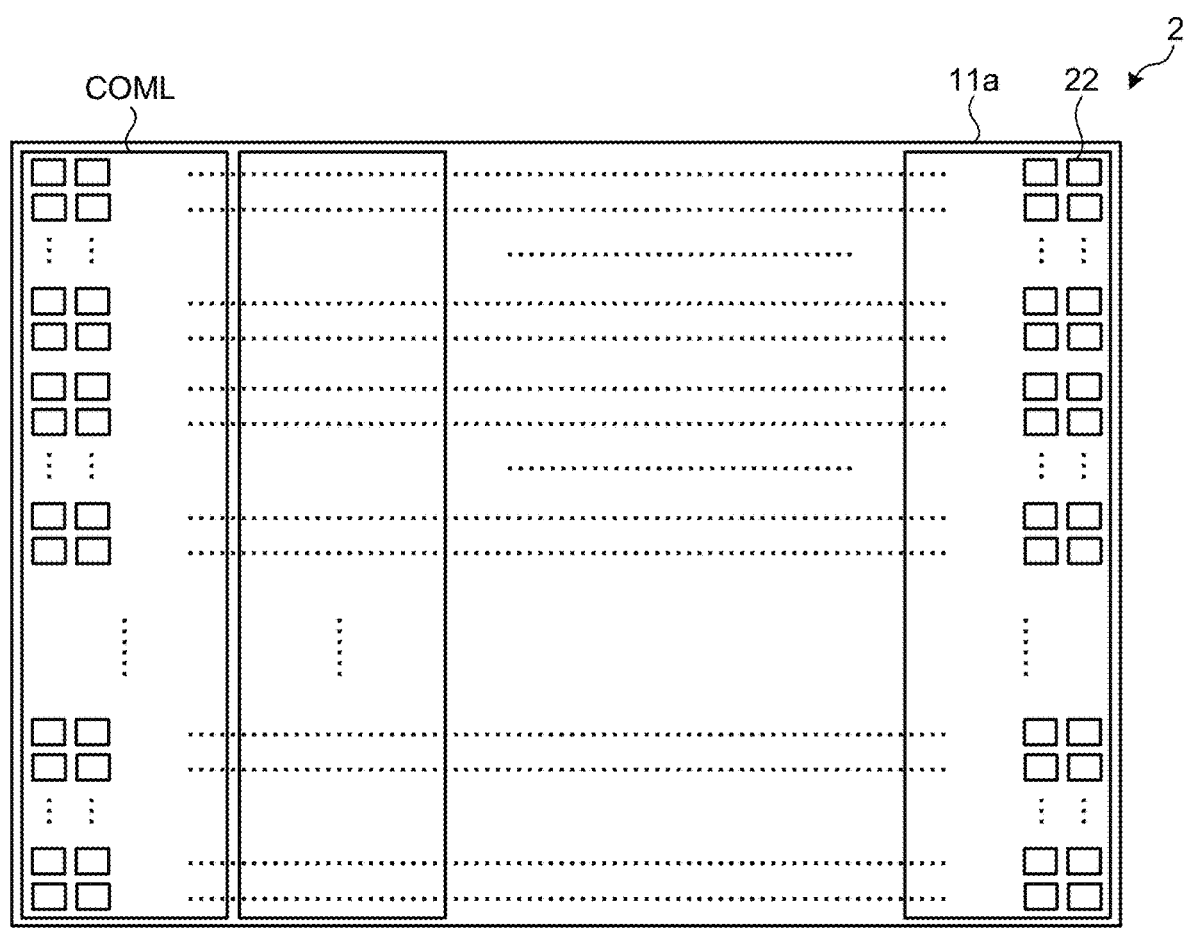
FIG. 5B is a plan view of a second example that schematically illustrates the TFT substrate included in the display device in the first embodiment.
Figure 5C:
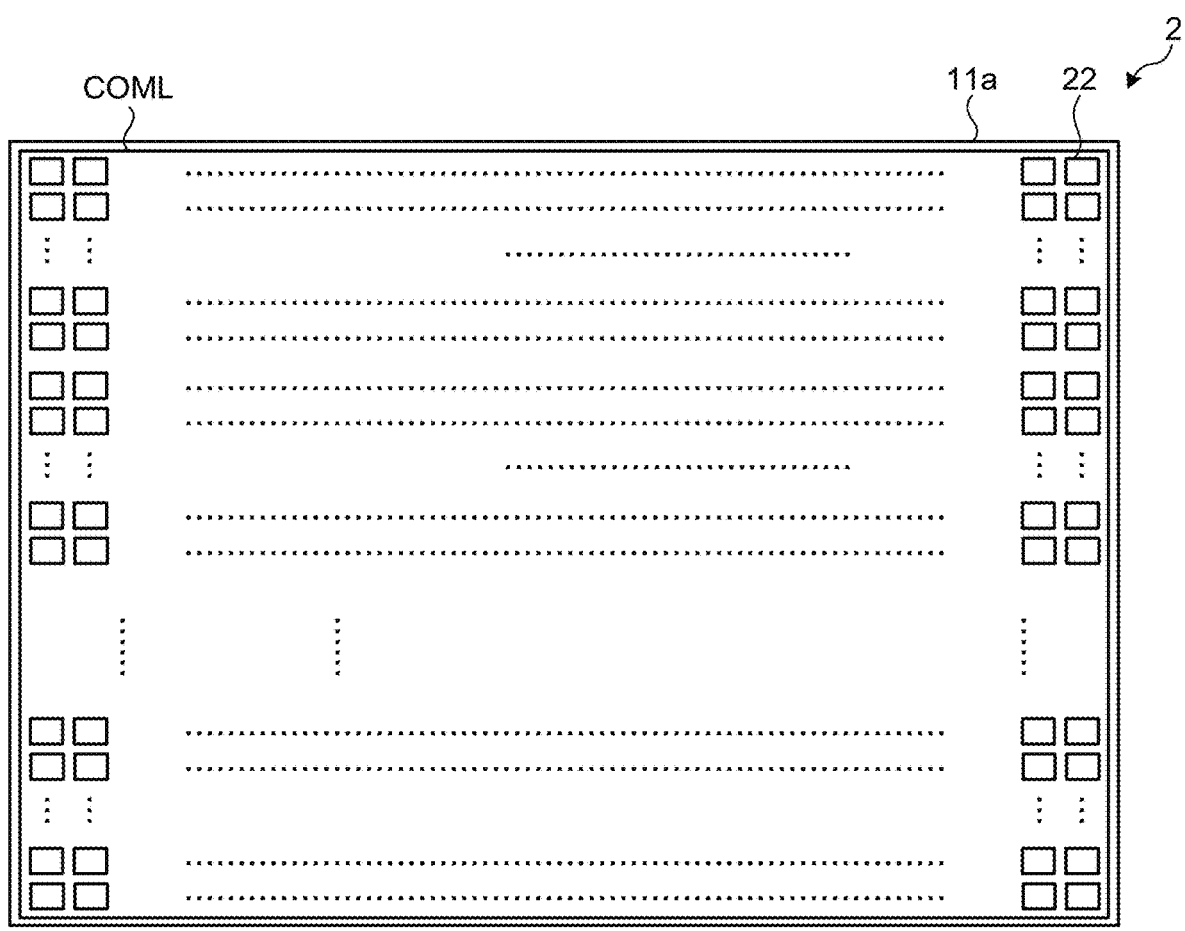
FIG. 5C is a plan view of a third example that schematically illustrates the TFT substrate included in the display device in the first embodiment.

Next, the schematic configuration of the display device 1 in the first embodiment will be described with reference to FIG. 2 to FIG. 5C. FIG. 2 is a cross-sectional view illustrating the schematic cross-sectional configuration of the display device. FIG. 3 is a plan view illustrating an example of the configuration of the pixel. FIG. 4 is a cross-sectional view cut along line A1-A2 in FIG. 3. FIG. 5A is a plan view of a first example that schematically illustrates a TFT substrate included in the display device in the first embodiment. FIG. 5B is a plan view of a second example that schematically illustrates the TFT substrate included in the display device in the first embodiment. FIG. 5C is a plan view of a third example that schematically illustrates the TFT substrate included in the display device in the first embodiment.

As illustrated in FIG. 2, the display device 1 includes a pixel substrate 2, a counter substrate 3 arranged so as to face the surface of the pixel substrate 2 in the perpendicular direction, and a liquid crystal layer 6 inserted between the pixel substrate 2 and the counter substrate 3.

As illustrated in FIG. 2, the pixel substrate 2 includes a thin film transistor (TFT) substrate 21 as a circuit board, the pixel electrodes 22, the first electrodes COML, and an insulating layer 24 insulating the pixel electrodes 22 and the first electrodes COML. The pixel electrodes 22 are arrayed in a matrix with a row-column configuration above the TFT substrate 21. The first electrodes COML are provided between the TFT substrate 21 and the pixel electrodes 22. A polarizing plate 35B is provided under the TFT substrate 21 with an adhesion layer (not illustrated) therebetween.

As illustrated in FIG. 5A to FIG. 5C, the first electrodes COML are provided in the display region 11a of the TFT substrate 21. The first electrodes COML are arranged in the display region 11a in the first example illustrated in FIG. 5A. To be more specific, the first electrodes COML are arrayed and arranged in the direction (Dx direction) along the long sides of the display region 11a and the direction (Dy direction) along the short sides of the display region 11a. Each first electrode COML has a substantially square shape in a plan view. The first electrodes COML are made of, for example, a conductive material having translucency, such as indium tin oxide (ITO). The pixel electrodes 22 are arranged in a matrix with a row-column configuration at a position corresponding to one first electrode COML. Each pixel electrode 22 has a smaller area than that of the first electrode COML. Although FIGS. 5A to 5C illustrate some first electrodes COML and some pixel electrodes 22, the first electrodes COML and the pixel electrodes 22 are arranged over the entire area of the display region 11a. The first electrodes COML may extend in the direction (Dy direction) along the short sides of the display region 11a and be arrayed in the direction (Dx direction) along the long sides of the display region 11a as in the second example illustrated in FIG. 5B. Alternatively, one first electrode COML may be provided over the entire area of the display region 11a as in the third example illustrated in FIG. 5C.

The counter substrate 3 includes a counter substrate 31 and a color filter 32 formed on one surface of the counter substrate 31. A polarizing plate 35A is provided above the color filter 32 with an adhesion layer (not illustrated) therebetween.

The TFT substrate 21 and the counter substrate 31 are arranged so as to face each other with a predetermined gap therebetween. The liquid crystal layer 6 as a display function layer is provided in a space between the TFT substrate 21 and the counter substrate 31. The liquid crystal layer 6 modulates light that passes therethrough according to an electric field state, and, for example, liquid crystal in a transverse electric field mode such as in-plane switching (IPS) including fringe field switching (FFS) is used therefor. Orientation films may be respectively arranged between the liquid crystal layer 6 and the pixel substrate 2 and between the liquid crystal layer 6 and the counter substrate 3.

The pixel transistors Tr of the pixels Pix, the signal lines SGL supplying the pixel signals SIG to the pixel electrodes 22, the gate lines GCL supplying the gate signals GATE driving the pixel transistors Tr, and other wiring lines are formed on the TFT substrate 21. The signal lines SGL and the gate lines GCL extend in a plane parallel to the surface of the TFT substrate 21.

As illustrated in FIG. 3, a region surrounded by the gate lines GCL and the signal lines SGL is the pixel Pix. The pixel Pix includes a region in which the pixel electrode 22 and the first electrode COML overlap with each other. The pixel electrodes 22 are coupled to the signal lines SGL through the pixel transistors Tr.

As illustrated in FIG. 3, each pixel electrode 22 has a plurality of band-like electrodes 22a and connection portions 22b. The band-like electrodes 22a are provided along the signal lines SGL and are aligned in the direction along the gate lines GCL. The connection portions 22b connect end portions of the band-like electrodes 22a. Although the pixel electrodes 22 have five band-like electrodes 22, they are not limited thereto and may have four or less or six or more band-like electrodes 22a. The pixel electrodes 22 may have two band-like electrodes 22a, for example.

As illustrated in FIG. 3, each pixel transistor Tr includes a semiconductor layer 61, a source electrode 62, a drain electrode 63, and a gate electrode 64. A light shielding layer 65 is provided under the semiconductor layer 61.

As illustrated in FIG. 4, the light shielding layer 65 is provided on the upper side of a substrate 121. An insulating layer 58a covers the light shielding layers 65 and is provided on the upper side of the substrate 121. The semiconductor layer 61 is provided on the upper side of the insulating layer 58a. The gate electrode 64 (gate lines GCL) is provided above the semiconductor layer 61 with an insulating layer 58b therebetween. The drain electrode 63 and the source electrode 62 (signal line SGL) are provided above the gate electrode 64 (gate line GCL) with an insulating layer 58c therebetween. The first electrode COML is provided above the drain electrode 63 and the source electrode 62 (signal line SGL) with an insulating layer 58d and an insulating layer 58e therebetween. The pixel electrode 22 is provided above the first electrode COML with the insulating layer 24 therebetween. An orientation film 34 is provided on the upper side of the pixel electrode 22. An orientation film 33 faces the orientation film 34 with the liquid crystal layer 6 interposed therebetween. Auxiliary wiring lines 50, which will be described later, are provided above the insulating layer 58d.

As illustrated in FIG. 3 and FIG. 4, the pixel electrode 22 is coupled to the drain electrode 63 of the pixel transistor Tr through a contact hole H11. The semiconductor layer 61 is coupled to the drain electrode 63 through a contact hole H12. The semiconductor layer 61 intersects with the gate electrode 64 in a plan view. The gate electrode 64 is coupled to the gate line GCL and is provided so as to project from one side of the gate line GCL. The semiconductor layer 61 extends to a position overlapping with the source electrode 62 and is electrically coupled to the source electrode 62 through a contact hole H13. The source electrode 62 is coupled to the signal line SGL and project from one side of the signal line SGL.

A well-known material such as polysilicon and oxide semiconductor can be used as a material of the semiconductor layers 61. For example, usage of transparent amorphous oxide semiconductor (TAOS) can achieve excellent ability to retain a voltage for video image display for a long period of time (retention rate) and improve display quality.

Well-known insulating materials can be used as materials of the insulating layers 24, 58a, 58b, 58c, 58d, and 58e. For example, tetraethyl orthosilicate (TEOS) can be used as the material of the insulating layer 58b. For example, a silicon oxide film ($SiO_2$) can be used as the material of the insulating layer 58c.

A channel portion (not illustrated) is provided in a portion of the semiconductor layer 61 that overlaps with the gate electrode 64. The light shielding layer 65 is provided at a position overlapping with the channel portion and preferably has a larger area than that of the channel portion. The light shielding layer 65 is provided to block light that would be incident on the semiconductor layer 61 from the backlight, for example.

Figure 6:
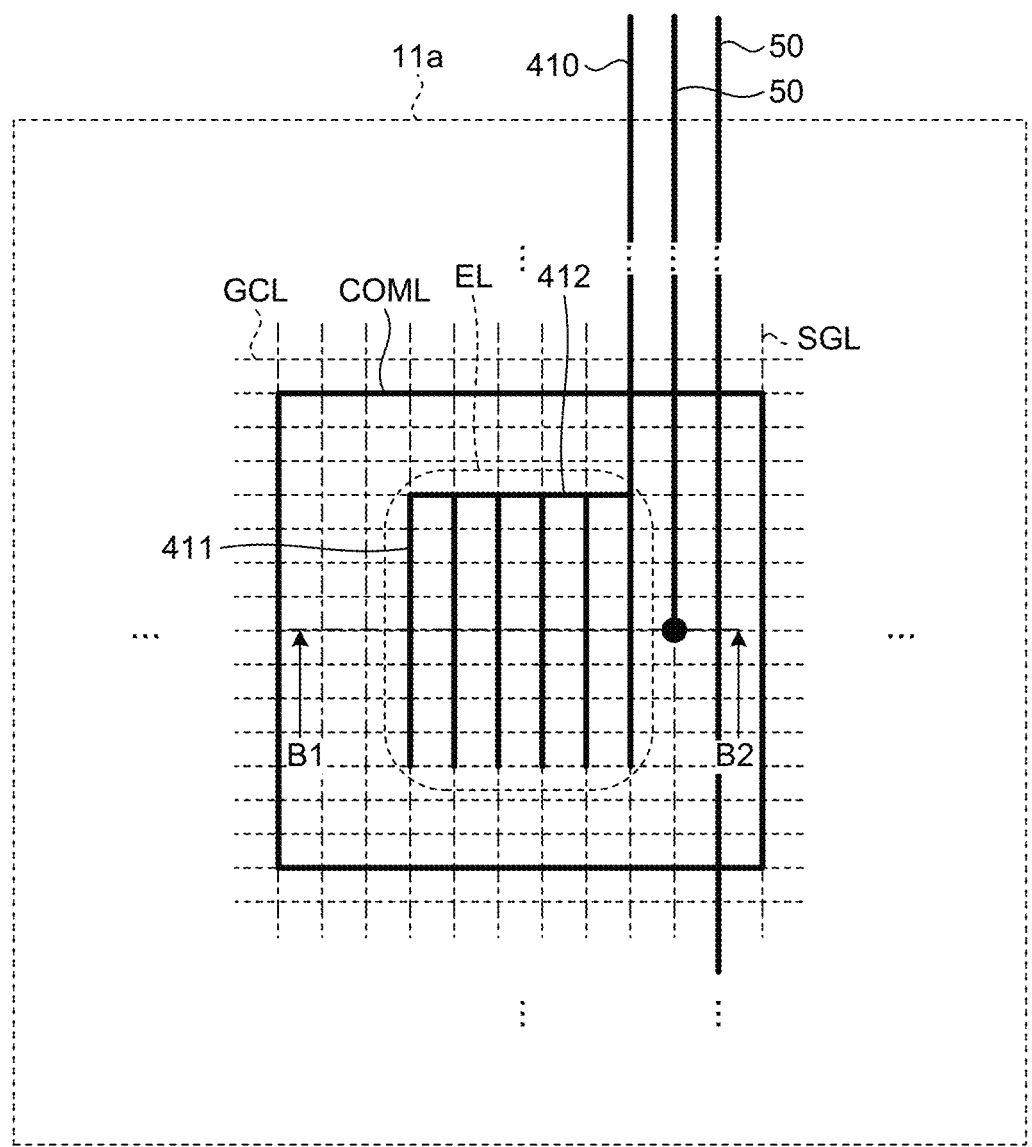
FIG. 6 is a plan view illustrating an example of the configuration of a second electrode in the first embodiment.
Figure 7:
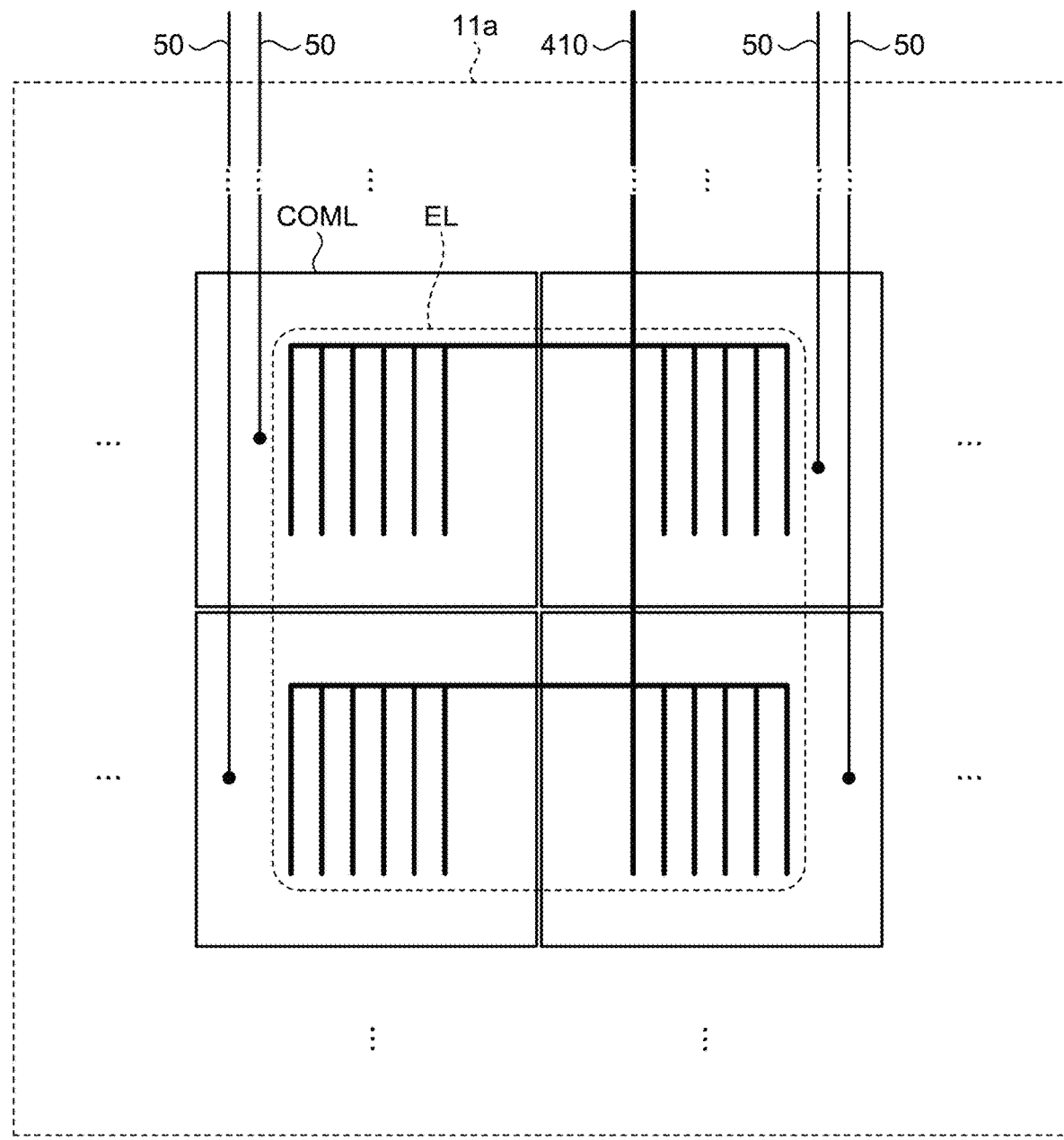
FIG. 7 is a plan view illustrating an example of the configuration of the second electrode in the first embodiment that is different from that in FIG. 6.
Figure 8:
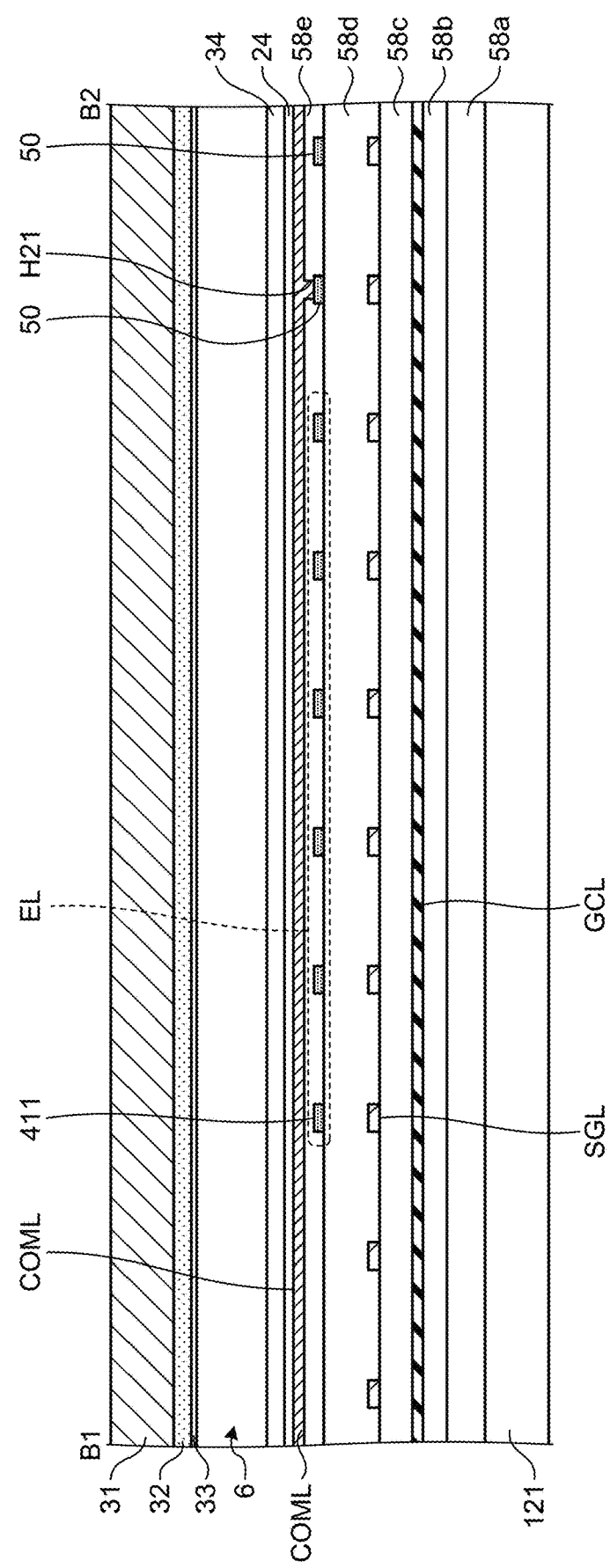
FIG. 8 is a cross-sectional view cut along line B1-B2 in FIG. 6.

FIG. 6 is a plan view illustrating an example of the configuration of the second electrode in the first embodiment. FIG. 7 is a plan view illustrating an example of the configuration of the second electrode in the first embodiment that is different from that in FIG. 6. FIG. 8 is a cross-sectional view cut along line B1-B2 in FIG. 6. FIG. 6 to FIG. 8 omit components of the pixels Pix illustrated in FIG. 3.

As illustrated in FIG. 6 to FIG. 8, the second electrodes EL in the first embodiment are provided on the upper side of the insulating layer 58d. Each second electrode EL includes a plurality of branch electrodes 411 overlapping with the signal lines SGL.

The branch electrodes 411 are provided in parallel in the same layer as the auxiliary wiring line 50 that is coupled to the first electrode COML. The first electrode COML and the auxiliary wiring line 50 are not electrically coupled to each other. As illustrated in FIG. 8, the auxiliary wiring line 50 is coupled to the first electrode COML through a contact hole H21. The auxiliary wiring line 50 is provided so as to overlap with the signal line SGL in a manner similar to each branch electrode 411. The "same layer" in the specification is a layer formed by the same process and made of the same material.

The branch electrodes 411 are coupled to a branch wiring line 412 overlapping with the gate line GCL. The branch wiring line 412 is coupled to a wiring line 410 overlapping with the signal line SGL and extended from the display region 11a.

The second electrodes EL are provided in the display region 11a. Although one second electrode EL overlaps with one first electrode COML in the example illustrated in FIG. 6 and FIG. 8, a correspondence relation between the first electrode COML and the second electrode EL is not limited thereto. For example, one second electrode EL may overlap with four first electrodes COML as illustrated in FIG. 7, or the first electrode COML that does not overlap with the second electrode EL may be present.

Figure 9:
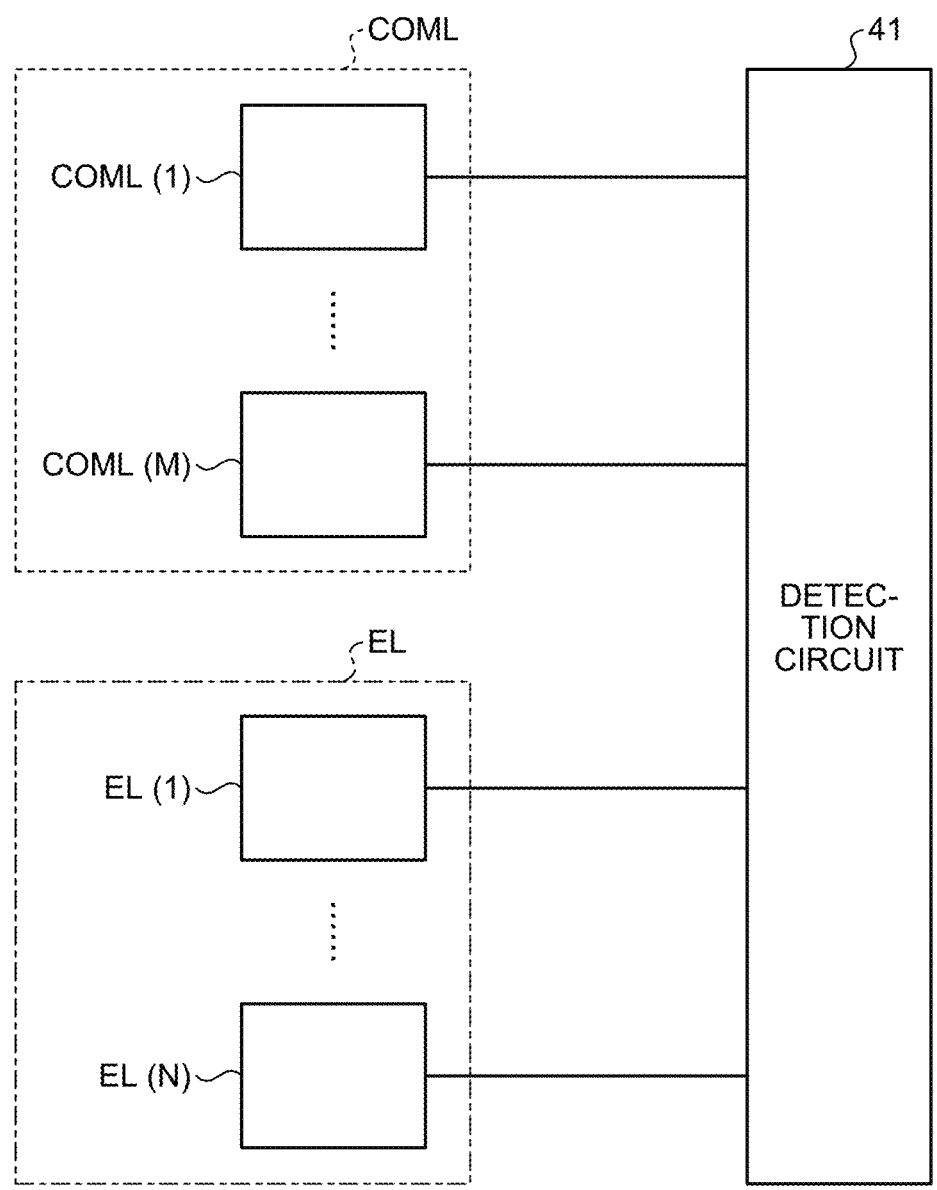
FIG. 9 is a view illustrating an example of the coupling configuration of a detection circuit.

FIG. 9 is a view illustrating an example of the coupling configuration of the detection circuit. FIG. 9 illustrates the configuration having M first electrodes COML and N second electrodes EL.

The detection circuit 41 performs the touch detection and the force detection using what is called a self-capacitive detection method in the embodiment. To be specific, the detection circuit 41 performs the touch detection based on capacitance (fourth capacitance) generated between the first electrode COML and a detection target. To be specific, the detection circuit 41 performs the force detection based on capacitance (first capacitance) generated between the second electrode EL and the signal lines SGL.

Figure 10:
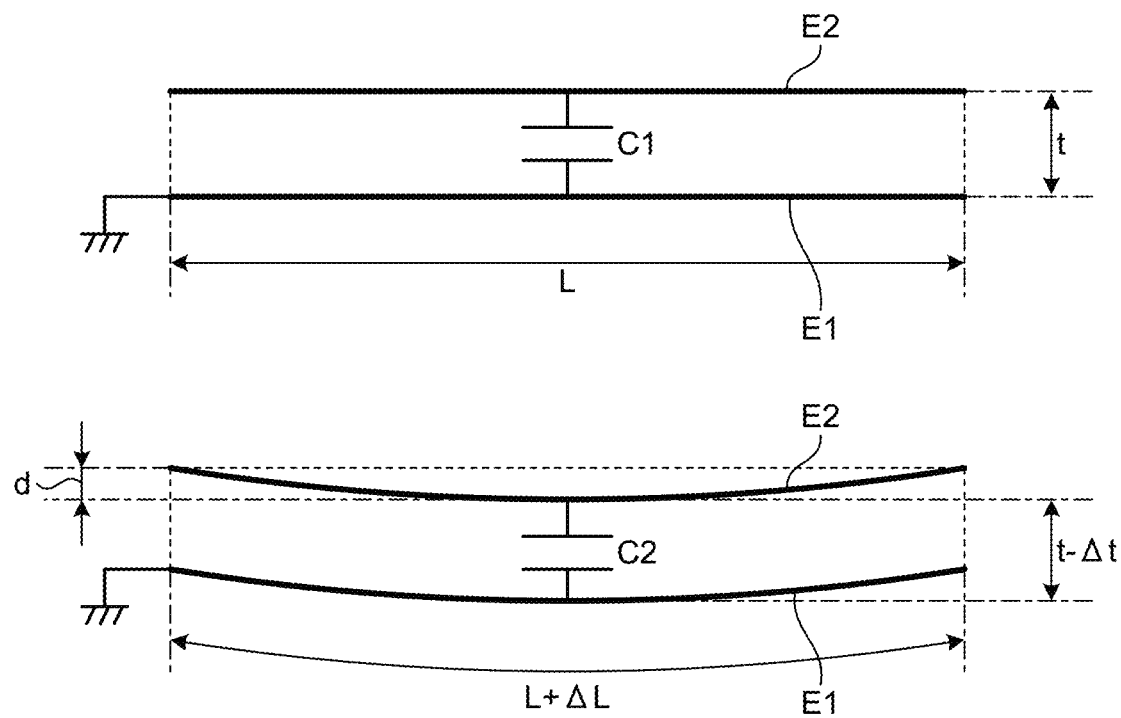
FIG. 10 is a view for explaining a self-capacitive detection method.

FIG. 10 is a view for explaining the of the self-capacitive detection method. The capacitance (first capacitance) generated between the second electrode EL and the signal line SGL will be described here.

An electrode E1 corresponds to the signal line SGL in FIG. 10. An electrode E2 corresponds to the second electrode EL in FIG. 10. A distance t between the electrode E1 and the electrode E2 corresponds to the thickness of the insulating layer 58d in FIG. 10.

When the force detection is performed, the electrode E1 (signal line SGL) is set to have a fixed potential (GND potential). When no force is applied to the display surface, supply of a predetermined potential to the electrode E2 (second electrode EL) generates capacitance C1 between the electrode E1 (signal line SGL) and the electrode E2 (second electrode EL) as illustrated in an upper diagram of FIG. 10.

When the force is applied to the display surface and the display panel 10 is thereby pushed and deformed by an amount d as illustrated in FIG. 10, a width L of each of the electrode E1 (signal line SGL) and the electrode E2 (second electrode EL) increases by ΔL (L+ΔL). The areas of the electrode E1 (signal line SGL) and the electrode E2 (second electrode EL) thereby increase. The distance t between the electrode E1 (signal line SGL) and the electrode E2 (second electrode EL) decreases by Δt (t−Δt).

Capacitance C2 generated between the electrode E1 (signal line SGL) and the electrode E2 (second electrode EL) therefore becomes larger than the capacitance C1 obtained when no force is applied to the display surface. Thus, detection of a difference ΔC between the capacitance C2 when the force is applied to the display surface and the capacitance C1 when no force is applied to the display surface enables determination whether the force is applied to the display surface. A well-known method can be used for the specific self-capacitive detection method as described above. Explanation of the specific method in the self-capacitive detection method and a force calculation method in operation examples, which will be described later, is omitted here.

Figure 11:
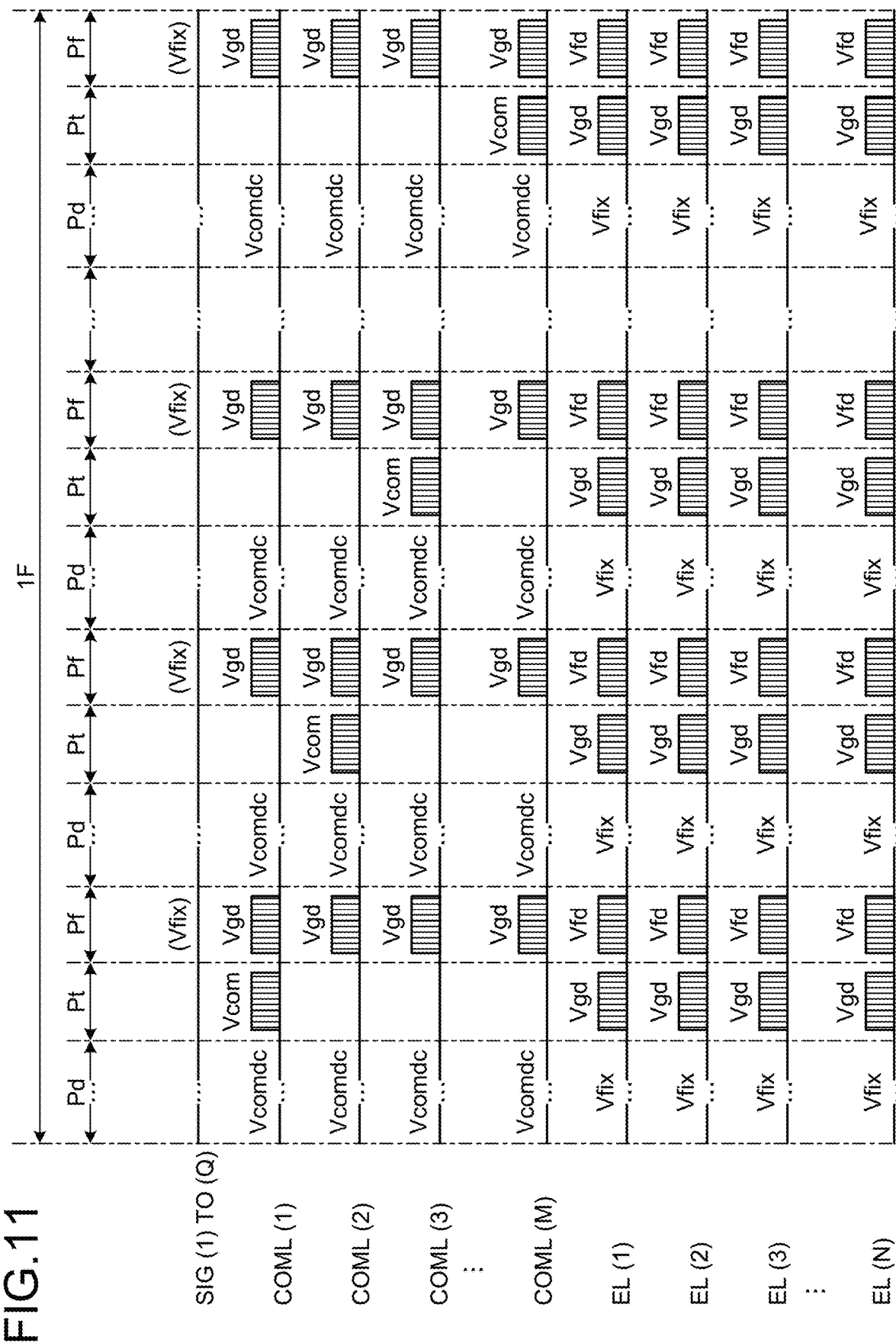
FIG. 11 is a first example of a timing chart illustrating an operation example of the display device in the first embodiment.

FIG. 11 is a first example of a timing chart illustrating an operation example of the display device in the first embodiment. FIG. 11 illustrates an example in which display periods Pd, touch detection periods Pt, and force detection periods Pf are provided in a time division manner in one frame period (1F). Hereinafter, the touch detection period Pt (or detection period Pt/Pf, which will be described later) is provided for each of the first electrodes COML(1), (2), . . . , and (M) in one frame period (1F).

The detection circuit 41 supplies, to the first electrodes COML, the common potential Vcomdc for the pixel electrodes 22 in the display periods Pd in the first example illustrated in FIG. 11. The detection circuit 41 supplies the fixed potential Vfix to the second electrodes EL in the display periods Pd. The fixed potential Vfix is, for example, the GND potential. The display device 1 can thereby perform stable image display without being influenced by the second electrodes EL.

In each of the touch detection periods Pt in the first example illustrated in FIG. 11, the detection circuit 41 supplies the touch detection signal Vcom to the first electrode COML with which the touch detection is performed. The detection circuit 41 supplies the guard signal Vgd to the second electrodes EL in the touch detection periods Pt. The guard signal Vgd has the same waveform as the touch detection signal Vcom and is synchronized with the touch detection signal Vcom as described above. The display device 1 can thereby perform stable touch detection without being influenced by the second electrodes EL.

The detection circuit 41 supplies the force detection signal Vfd to the second electrodes EL in the force detection periods Pf in the first example illustrated in FIG. 11. The detection circuit 41 supplies the guard signal Vgd to all of the first electrodes COML in the force detection periods Pf. In this time, the signal line drive circuit 13 supplies the fixed potential Vfix to the signal lines SGL. The display device 1 can thereby perform stable force detection without being influenced by the first electrodes COML and the signal lines SGL.

Figure 12:
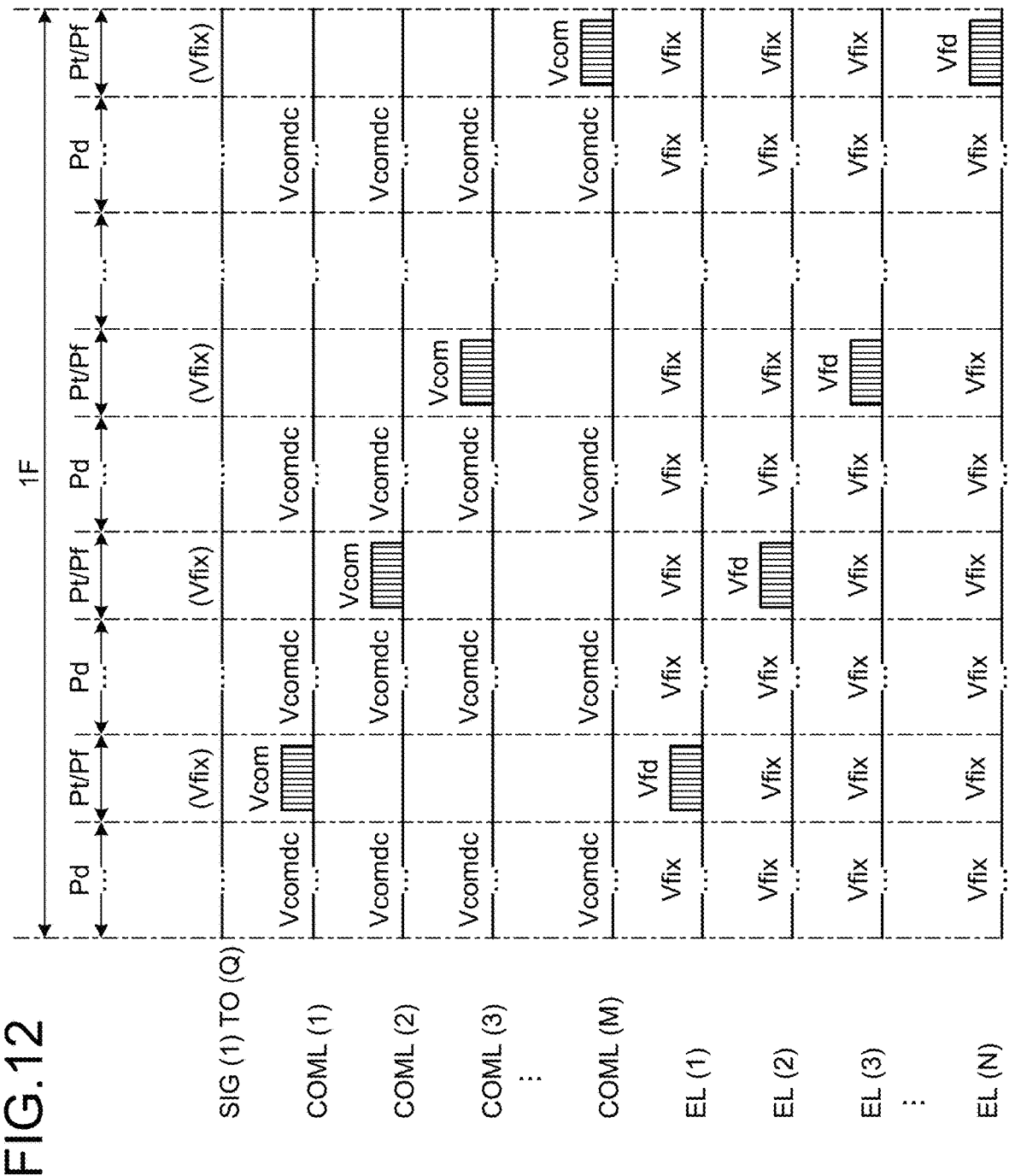
FIG. 12 is a second example of the timing chart illustrating the operation example of the display device in the first embodiment.

FIG. 12 is a second example of the timing chart illustrating the operation example of the display device in the first embodiment. FIG. 12 illustrates an example in which the display periods Pd and the detection periods Pt/Pf are alternately provided in a time division manner in one frame period (1F). The detection period Pt/Pf is a period in which the touch detection and the force detection are simultaneously performed. The second example illustrated in FIG. 12 indicates the operation example in a configuration in which one second electrode EL overlaps with one first electrode COML as illustrated in FIG. 6 and FIG. 8.

The operations in the display periods Pd are the same as those in the first example illustrated in FIG. 11. On the other hand, in each of the detection periods Pt/Pf in the second example illustrated in FIG. 12, the detection circuit 41 supplies the touch detection signal Vcom to the first electrode COML for which the touch detection is performed. In each detection period Pt/Pf, the detection circuit 41 supplies the force detection signal Vfd to the second electrode EL corresponding to the first electrode COML with which the touch detection is performed, and supplies the fixed potential Vfix to the second electrodes EL corresponding to the first electrodes COML with which the touch detection is not performed. In this time, the signal line drive circuit 13 supplies the fixed potential Vfix to the signal lines SGL. The display device 1 can thereby perform stable touch detection and force detection without being influenced by the signal lines SGL.

Figure 13:
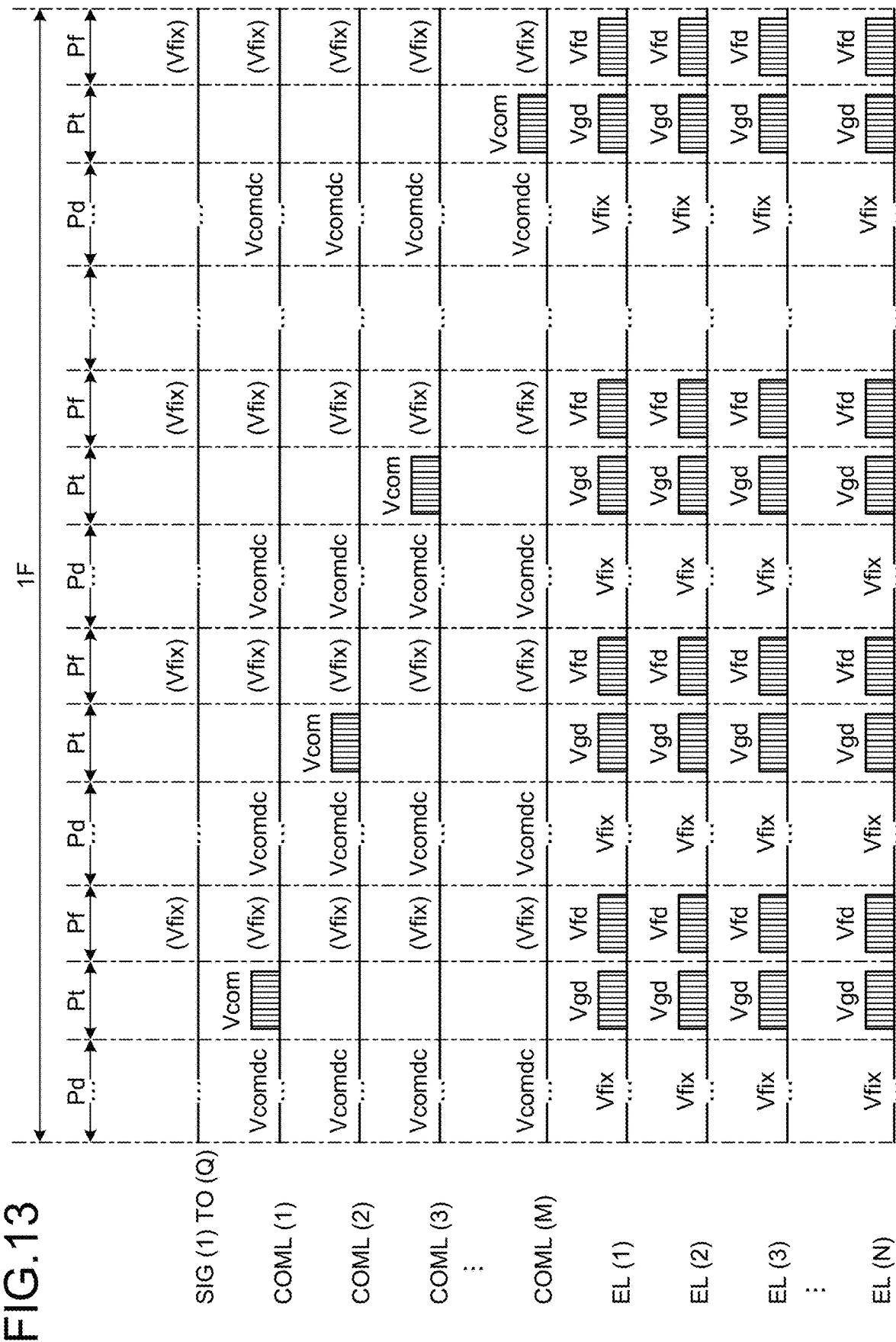
FIG. 13 is a third example of the timing chart illustrating the operation example of the display device in the first embodiment.
Figure 14:
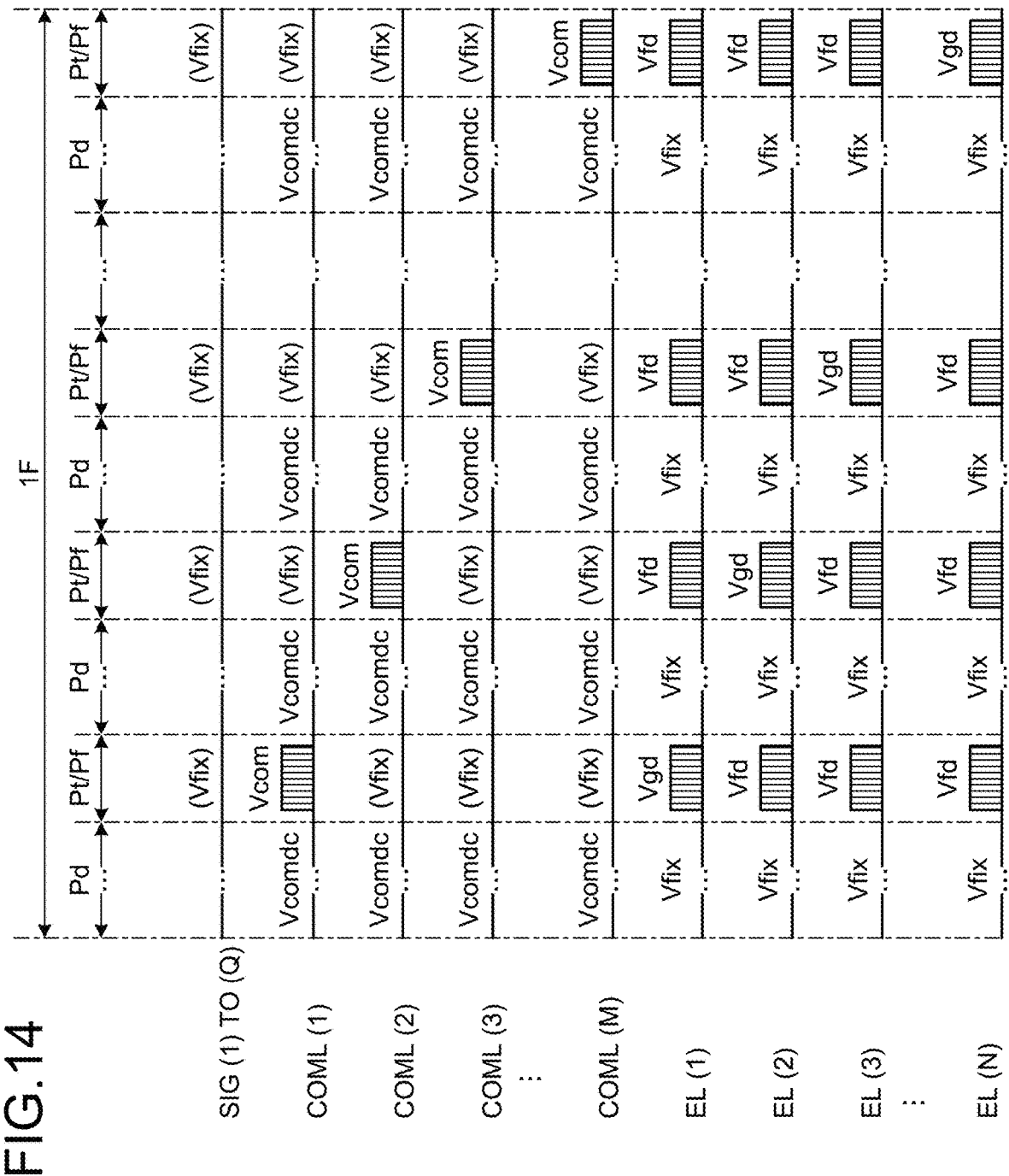
FIG. 14 is a fourth example of the timing chart illustrating the operation example of the display device in the first embodiment.

FIG. 13 is a third example of the timing chart illustrating the operation example of the display device in the first embodiment. FIG. 14 is a fourth example of the timing chart illustrating the operation example of the display device in the first embodiment. The third example illustrated in FIG. 13 and the fourth example illustrated in FIG. 14 are different from the first example illustrated in FIG. 11 and the second example illustrated in FIG. 12 in the point that force detection is performed based on capacitance (third capacitance) obtained by adding the capacitance (first capacitance) generated between the second electrode EL and the signal lines SGL and capacitance (second capacitance) generated between the second electrode EL and the first electrode COML.

The third example illustrated in FIG. 13 indicates an example in which the display periods Pd, the touch detection periods Pt, and the force detection periods Pf are provided in a time division manner in one frame period (1F) as in the first example illustrated in FIG. 11.

The third example illustrated in FIG. 13 is different from the first example illustrated in FIG. 11 in the point that the detection circuit 41 supplies the fixed potential Vfix to all of the first electrodes COML in the force detection periods Pf. The force detection can thereby be performed based on the capacitance (third capacitance) obtained by adding the capacitance (first capacitance) generated between the second electrode EL and the signal lines SGL and the capacitance (second capacitance) generated between the second electrode EL and the first electrode COML, whereby the detection accuracy is enhanced in comparison with that in the first example illustrated in FIG. 11.

The fourth example illustrated in FIG. 14 indicates an example in which the display periods Pd and the detection periods Pt/Pf are alternately provided in a time division manner in one frame period (1F) as in the second example illustrated in FIG. 12. The detection period Pt/Pf is a period in which the touch detection and the force detection are simultaneously performed. The fourth example illustrated in FIG. 14 indicates the operation example in the configuration in which one second electrode EL overlaps with one first electrode COML as in the second example illustrated in FIG. 12.

In each detection period Pt/Pf in the fourth example illustrated in FIG. 14, the detection circuit 41 supplies the touch detection signal Vcom to the first electrode COML with which the touch detection is performed, and supplies the fixed potential Vfix to the first electrodes COML with which the touch detection is not performed. In each detection period Pt/Pf, the detection circuit 41 supplies the guard signal Vgd to the second electrode EL corresponding to the first electrode COML with which the touch detection is performed, and supplies the force detection signal Vfd to the second electrodes EL corresponding to the first electrodes COML with which the touch detection is not performed.

Stable touch detection can thereby be performed without being influenced by the second electrodes EL in the touch detection in the fourth example illustrated in FIG. 14. Stable force detection can be further performed without being influenced by the first electrodes COML in the force detection in the fourth example illustrated in FIG. 14.

In the fourth example illustrated in FIG. 14, the force detection can be performed based on the capacitance (third capacitance) obtained by adding the capacitance (first capacitance) generated between the second electrode EL and the signal lines SGL and the capacitance (second capacitance) generated between the second electrode EL and the first electrode COML as in the third example illustrated in FIG. 13. The detection accuracy can therefore be enhanced in comparison with the second example illustrated in FIG. 12.

Figure 15:
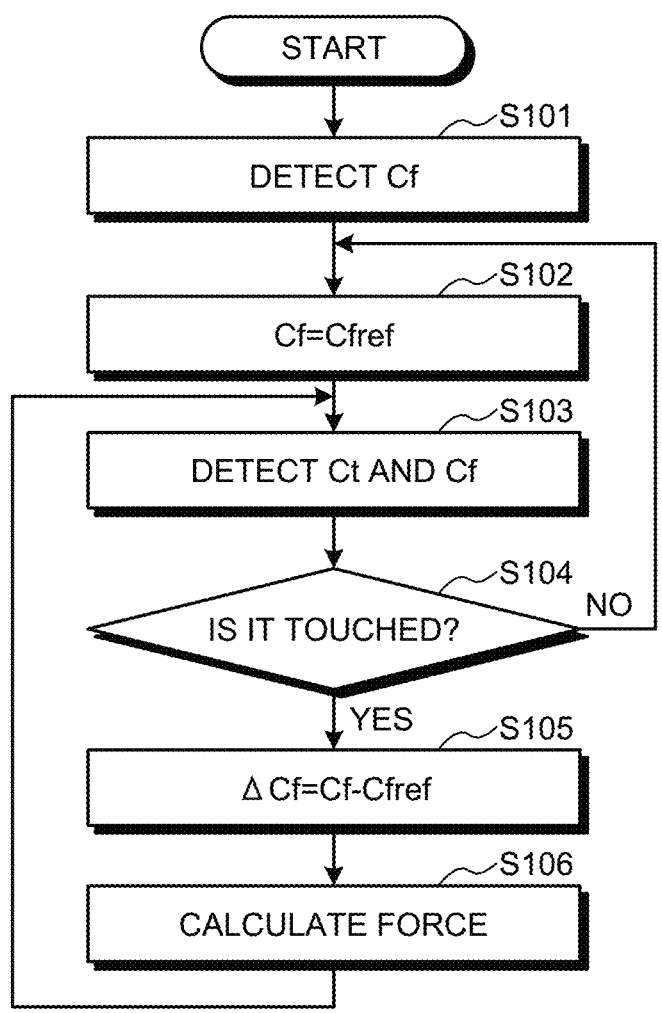
FIG. 15 is a flowchart illustrating an example of a detection operation of the display device in the first embodiment.

FIG. 15 is a flowchart illustrating an example of the detection operation of the display device in the first embodiment. In the example illustrated in FIG. 15, Cf indicates the capacitance (first capacitance) generated between the second electrode EL and the signal lines SGL or the capacitance (third capacitance) obtained by adding the capacitance (first capacitance) generated between the second electrode EL and the signal lines SGL and the capacitance (second capacitance) generated between the second electrode EL and the first electrode COML, that is, the capacitance to be used for the force detection. Also in the example illustrated in FIG. 15, Cfref indicates a capacitance reference value in the force detection. In the example illustrated in FIG. 15, Ct indicates the capacitance (fourth capacitance) generated between the first electrode COML and a detection target, that is, the capacitance to be used for the touch detection.

As illustrated in FIG. 15, the detection circuit 41 first detects the capacitance Cf (step S101) and sets the capacitance Cf to the capacitance reference value Cfref (step S102).

Subsequently, the detection circuit 41 detects the capacitance Cf and the capacitance Ct (step S103). The detection circuit 41 determines based on the capacitance Ct whether a touch detection state is made (step S104). When the touch detection state is not made (No at step S104), the process returns to the processing at step S102.

When the touch detection state is made (Yes at step S104), the detection circuit 41 calculates a difference ΔCf between the capacitance reference value Cfref and the capacitance Cf (step S105) and calculates force based on the calculated difference ΔCf between the capacitance reference value Cfref and the capacitance Cf (step S106). Thereafter, the process returns to the processing at step S103, and the processing step S102 to the processing step S106 are repeated.

When the touch detection state is not made (No at step S104) in the above-mentioned process, the capacitance Cf at this time is set to the capacitance reference value Cfref in the force detection (step S102). Errors of detection values due to thermal expansion of the insulating layer 58d, and the like, are thereby corrected.

As described above, the display device 1 in the first embodiment includes the display region 11a in which the pixels Pix are arrayed in the row direction (Dx direction) and the column direction (Dy direction), the gate lines GCL extending in the row direction (Dx direction) and coupled to the pixels Pix, the signal lines SGL extending in the column direction (Dy direction) and coupled to the pixels Pix, the pixel electrodes 22 provided in the pixels Pix, the first electrodes COML facing the pixel electrodes 22, the auxiliary wiring lines 50 coupled to the respective first electrodes COML, the second electrodes EL provided in the same layer as the auxiliary wiring lines 50 and overlapping with the signal lines SGL, and the detection circuit 41 that detects force applied to the display region 11a based on at least the capacitance (first capacitance) generated between the second electrode EL and the signal lines SGL.

The above-mentioned configuration provides the configuration that detects the force applied to the display region 11a without separately providing a layer to be provided with an electrode for force detection.

Detection of the force using the capacitance (third capacitance) obtained by adding the capacitance (first capacitance) generated between the second electrode EL and the signal lines SGL and the capacitance (second capacitance) generated between the second electrode EL and the first electrode COML is performed, whereby the detection accuracy of the force applied to the display surface in the display region 11a can be enhanced.

The embodiment can provide the configuration that detects the force applied to the display surface at low cost.

Second Embodiment

Figure 16:
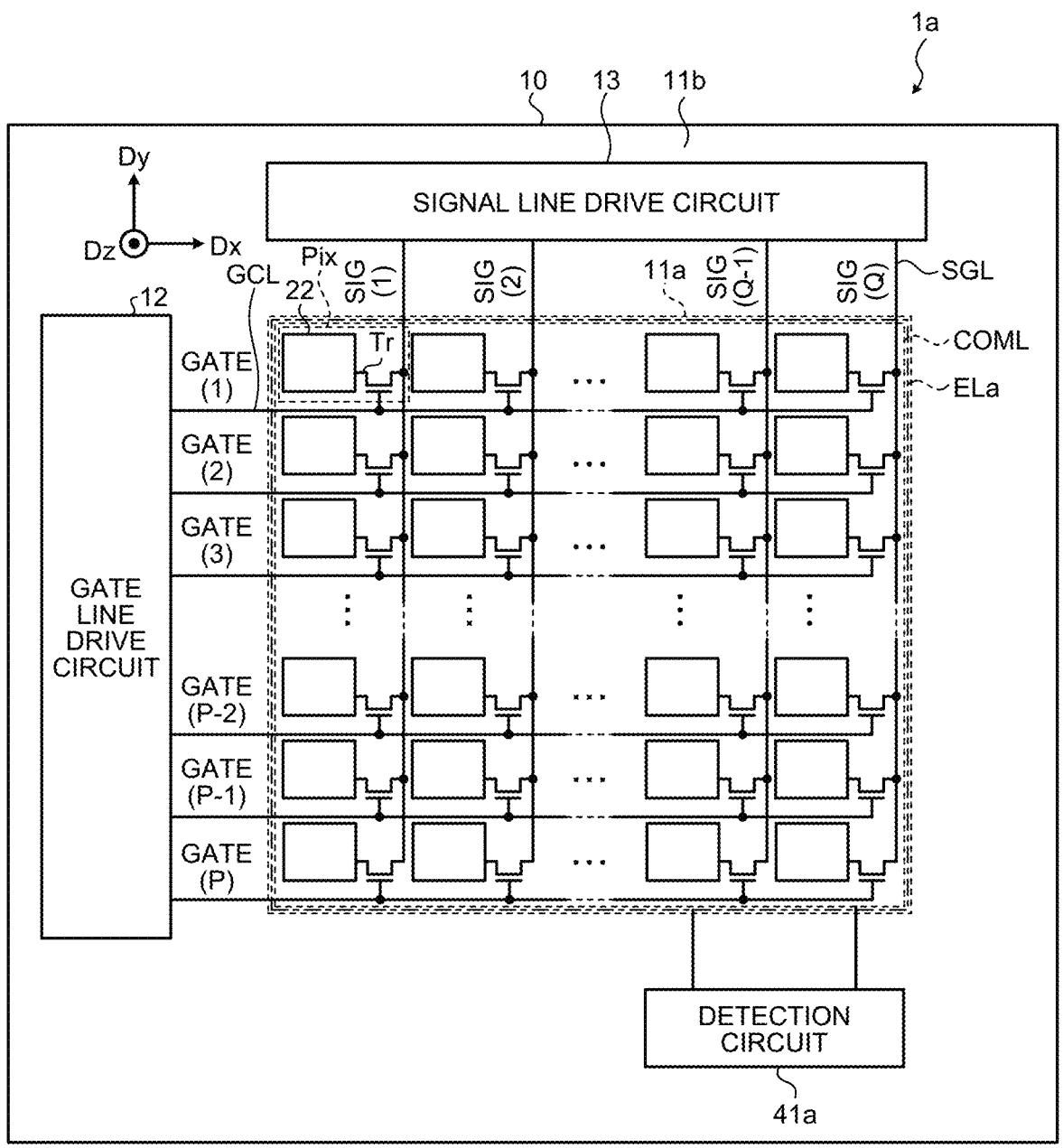
FIG. 16 is a block diagram illustrating an example of the configuration of a display device according to a second embodiment.
Figure 17:
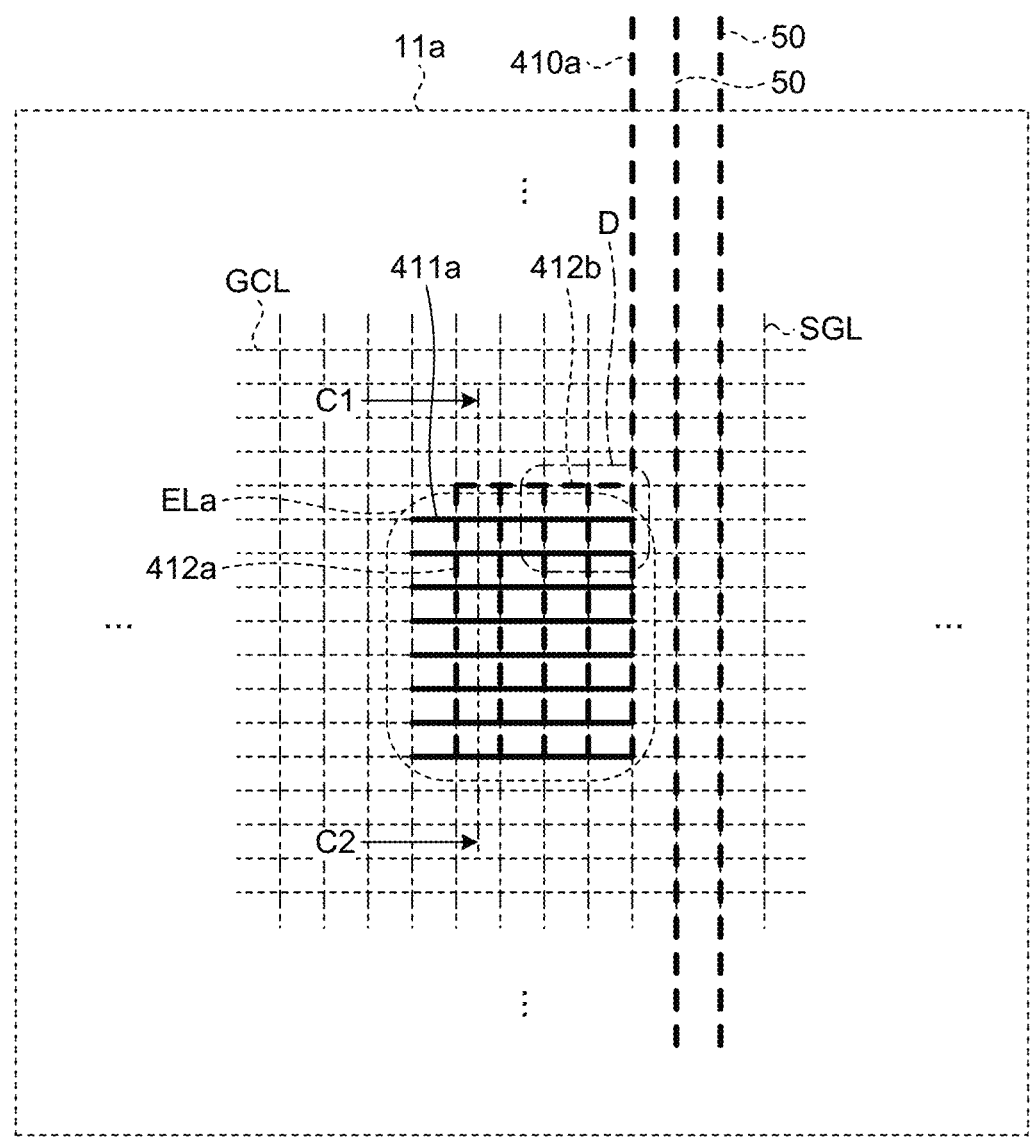
FIG. 17 is a plan view illustrating an example of the configuration of a second electrode in the second embodiment.
Figure 18:
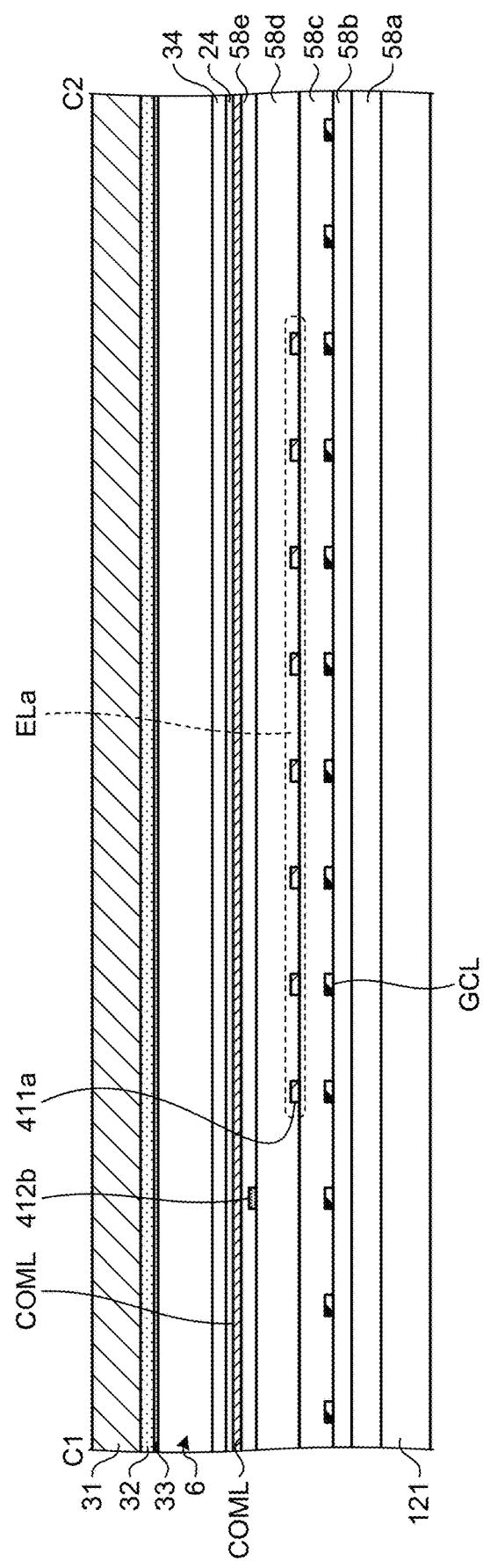
FIG. 18 is a cross-sectional view cut along line C1-C2 in FIG. 17.
Figure 19:
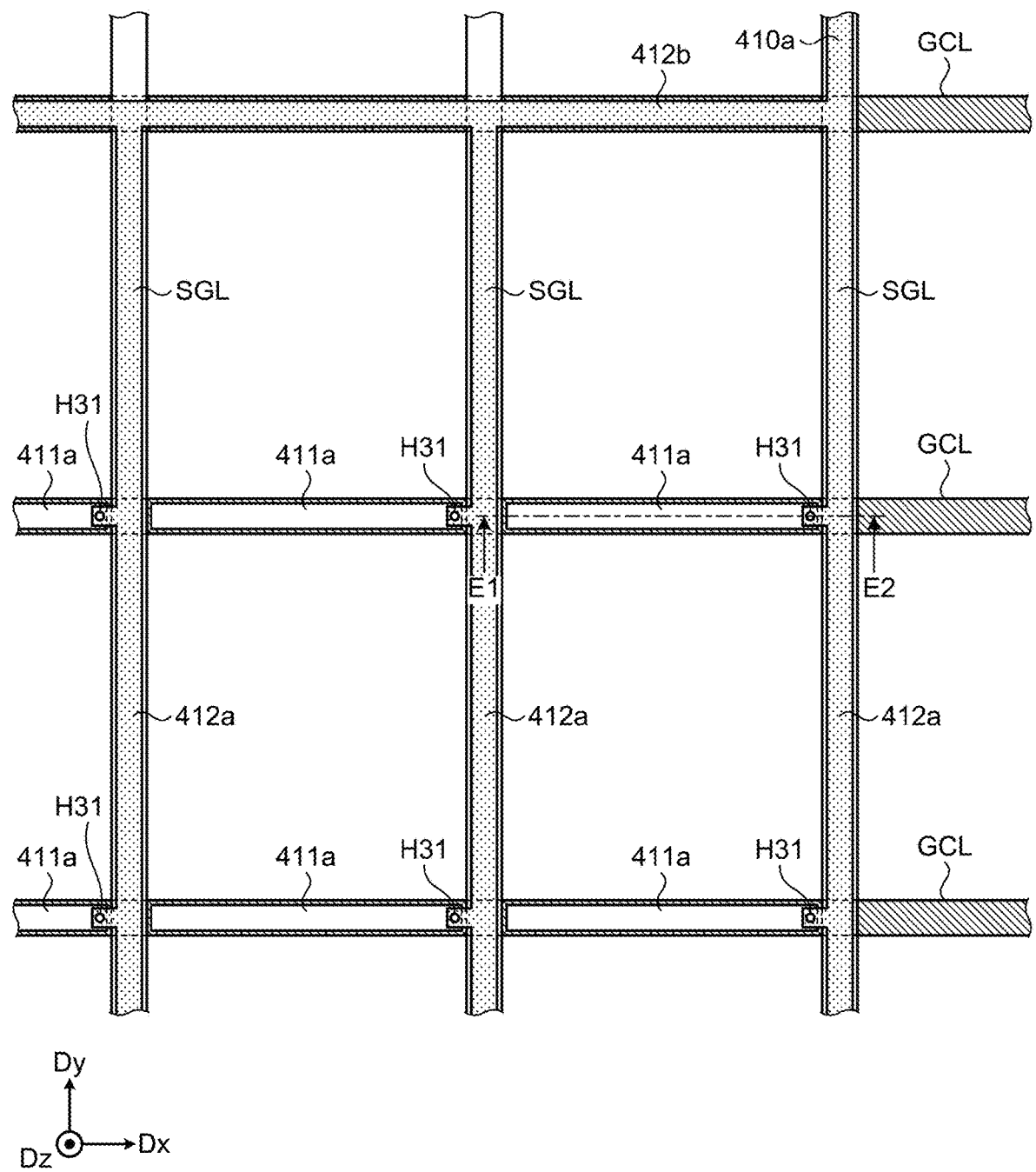
FIG. 19 is an enlarged view of a region D illustrated in FIG. 17.
Figure 20:
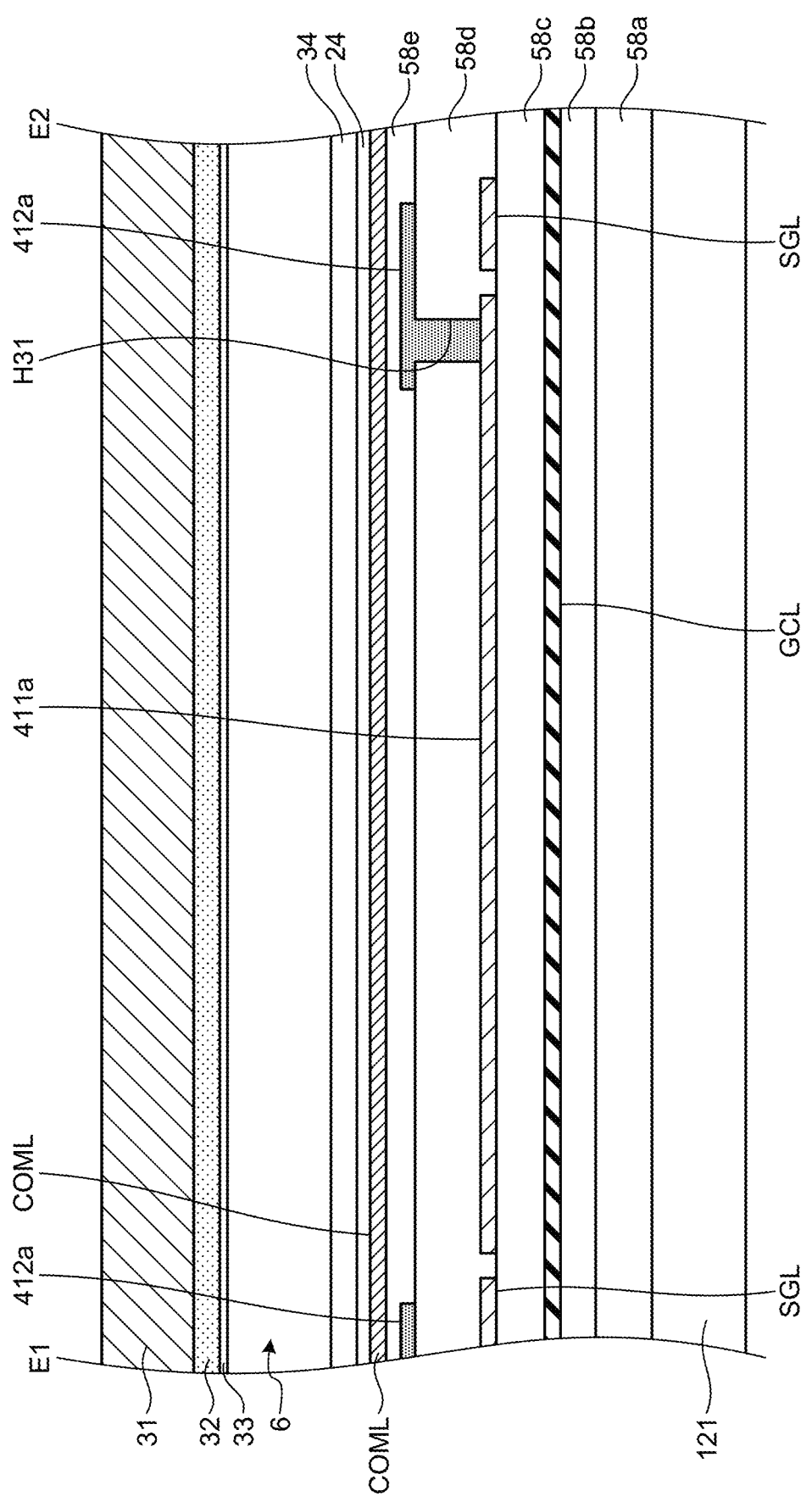
FIG. 20 is a cross-sectional view cut along line E1-E2 in FIG. 19.

FIG. 16 is a block diagram illustrating an example of the configuration of a display device according to a second embodiment. FIG. 17 is a plan view illustrating an example of the configuration of a second electrode in the second embodiment. FIG. 18 is a cross-sectional view cut along line C1-C2 in FIG. 17. FIG. 19 is an enlarged view of a region D illustrated in FIG. 17. FIG. 20 is a cross-sectional view cut along line E1-E2 in FIG. 19. Duplicate explanation of components that are equivalent to or the same as those described in the above-mentioned first embodiment is omitted. In FIG. 17 to FIG. 19, components of the pixels Pix illustrated in FIG. 3 are omitted.

As illustrated in FIG. 16 to FIG. 20, second electrodes ELa are provided in the insulating layer 58d in a display device 1a in the second embodiment. The second electrodes ELa are provided in the display region 11a.

Each second electrode ELa in the second embodiment includes a plurality of branch electrodes 411a overlapping with the gate lines GCL, as illustrated in FIG. 17 to FIG. 20.

The branch electrodes 411a are coupled to first branch wiring lines 412a overlapping with the signal lines SGL. The first branch wiring lines 412a are coupled to a second branch wiring line 412b overlapping with the gate line GCL. The first branch wiring lines 412a and the second branch wiring line 412b are provided on the upper side of the insulating layer 58d. The first branch wiring lines 412a and the second branch wiring line 412b correspond to a "wiring region" in the present disclosure.

As illustrated in FIG. 19, the branch electrodes 411a are provided between the signal lines SGL in a plan view. As illustrated in FIG. 19 and FIG. 20, one end of each branch electrode 411a is coupled to the first branch wiring line 412a through a contact hole H31.

The first branch wiring line 412a is coupled to a wiring line 410a overlapping with the signal line SGL and extended from the display region 11a through the second branch wiring line 412b.

A detection circuit 41a performs force detection based on capacitance (first capacitance) generated between the second electrode ELa and the gate lines GCL in the embodiment. That is to say, the electrode E1 illustrated in FIG. 10 corresponds to the gate line GCL. The electrode E2 illustrated in FIG. 10 corresponds to the second electrode ELa. The distance t between the electrode E1 and the electrode E2 illustrated in FIG. 10 corresponds to the thickness of the insulating layer 58c.

Figure 21:
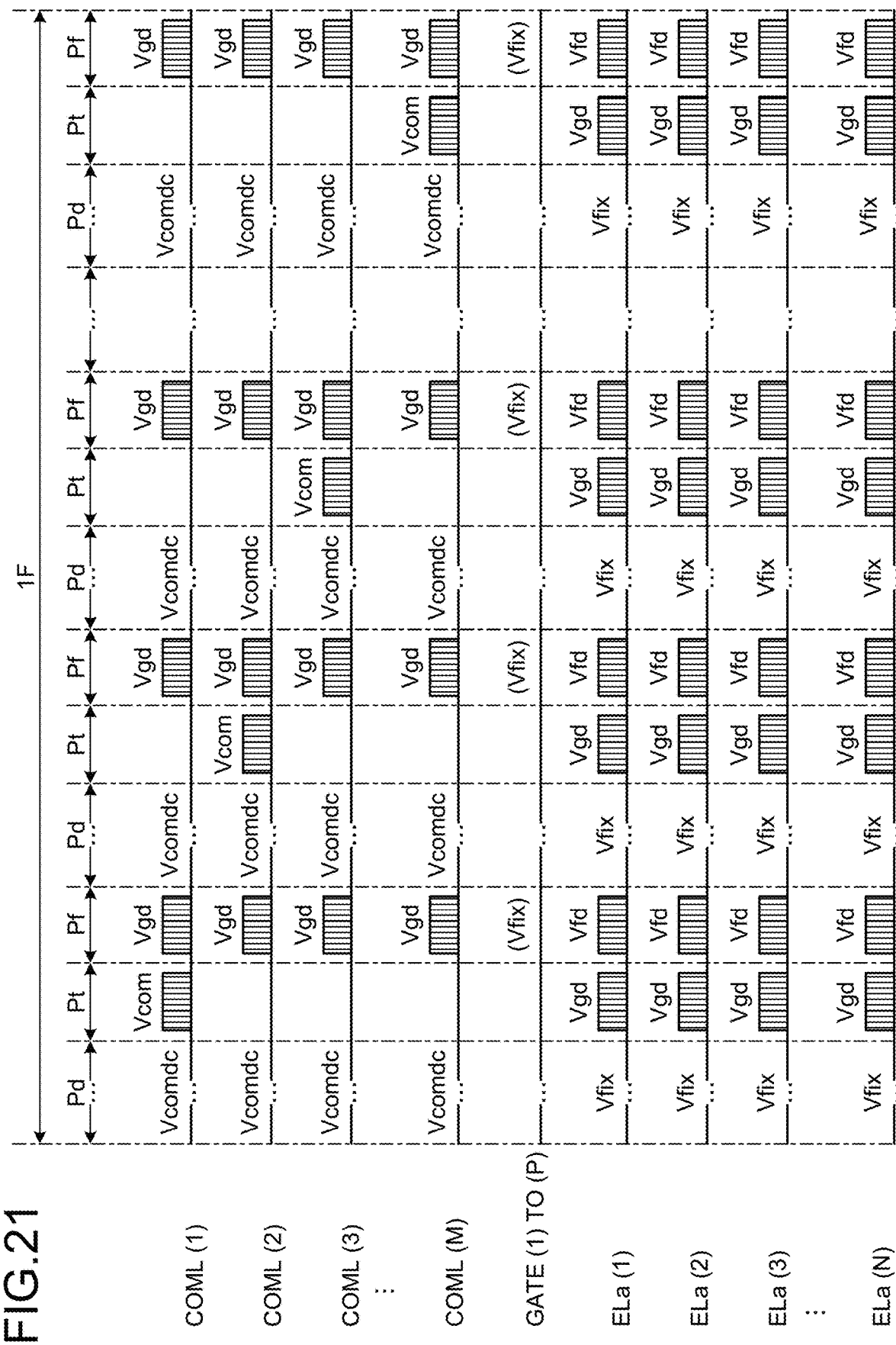
FIG. 21 is a first example of a timing chart illustrating an operation example of the display device in the second embodiment.

FIG. 21 is a first example of a timing chart illustrating an operation example of the display device in the second embodiment. FIG. 21 illustrates an example in which the display periods Pd, the touch detection periods Pt, and the force detection periods Pf are provided in a time division manner in one frame period (1F).

As in the first embodiment, the detection circuit 41a supplies, to the first electrodes COML, the common potential Vcomdc to the pixel electrodes 22 in the display periods Pd in the first example illustrated in FIG. 21. The detection circuit 41a supplies the fixed potential Vfix to the second electrodes ELa in the display periods Pd. The display device 1a can thereby perform stable image display without being influenced by the second electrodes ELa.

In each of the touch detection period Pt in the first example illustrated in FIG. 21, the detection circuit 41a supplies the touch detection signal Vcom to the first electrode COML with which the touch detection is performed. The detection circuit 41a supplies the guard signal Vgd to the second electrodes ELa in the touch detection periods Pt. The display device 1a can thereby perform stable touch detection without being influenced by the second electrodes ELa.

The detection circuit 41a supplies the force detection signal Vfd to the second electrodes ELa in the force detection periods Pf in the first example illustrated in FIG. 21. The detection circuit 41a supplies the guard signal Vgd to all of the first electrodes COML in the force detection periods Pf. In this time, the gate line drive circuit 12 supplies the fixed potential Vfix to the gate lines GCL. The display device 1a can thereby perform stable force detection without being influenced by the first electrodes COML and the gate lines GCL.

Figure 22:
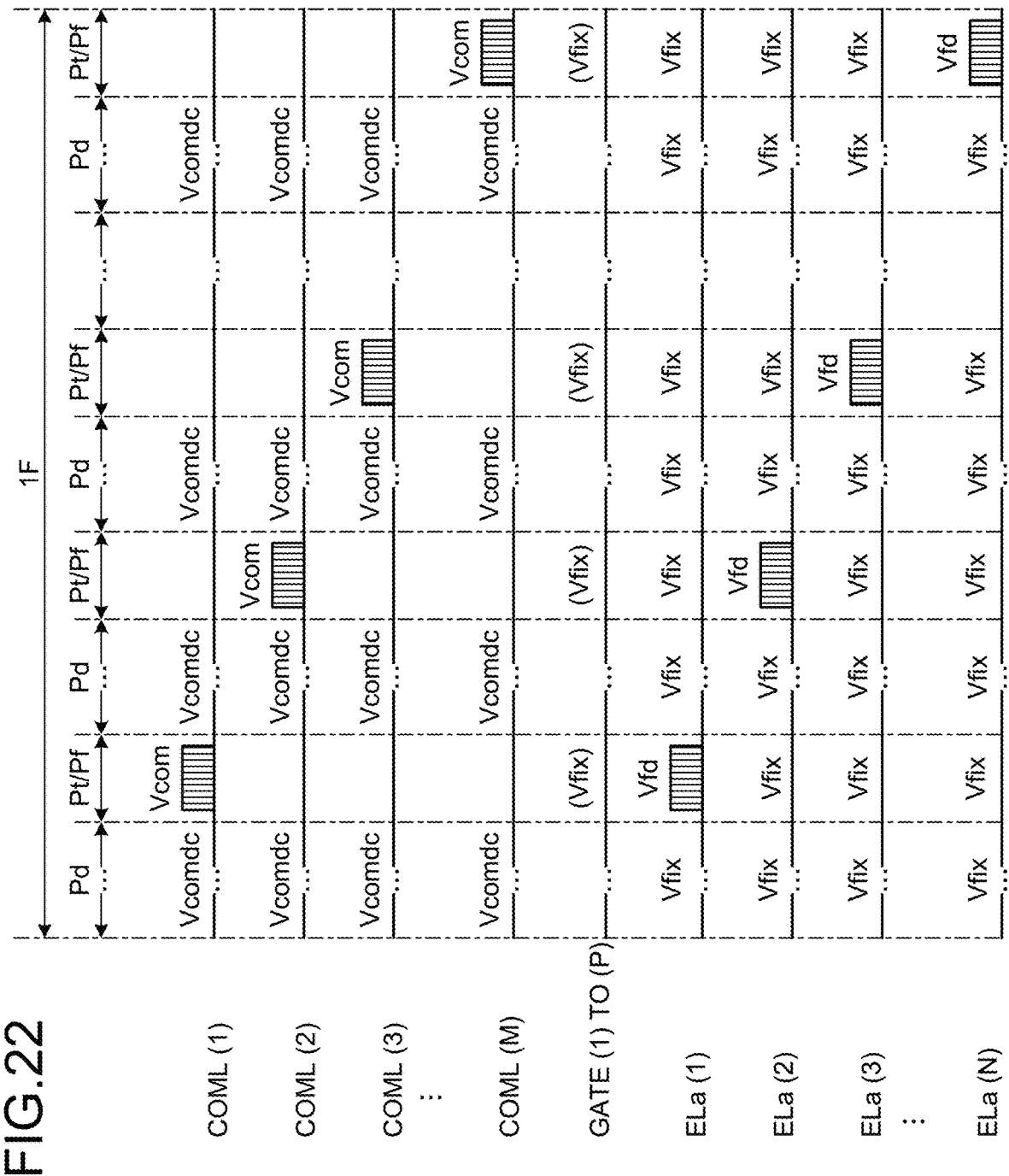
FIG. 22 is a second example of the timing chart illustrating the operation example of the display device in the second embodiment.

FIG. 22 is a second example of the timing chart illustrating the operation example of the display device in the second embodiment. FIG. 22 illustrates an example in which the display periods Pd and the detection periods Pt/Pf are alternately executed in a time division manner in one frame period (1F). The detection period Pt/Pf is a period in which the touch detection and the force detection are simultaneously performed. The second example illustrated in FIG. 22 indicates the operation example in the configuration in which one second electrode ELa overlaps with one first electrode COML as in the second example of the first embodiment that is illustrated in FIG. 12 and the fourth example of the first embodiment that is illustrated in FIG. 14.

The operations in the display periods Pd are the same as those in the first example illustrated in FIG. 21. On the other hand, in each of the detection periods Pt/Pf in the second example illustrated in FIG. 22, the detection circuit 41a supplies the touch detection signal Vcom to the first electrode COML with which the touch detection is performed. In each detection period Pt/Pf, the detection circuit 41a supplies the force detection signal Vfd to the second electrode ELa corresponding to the first electrode COML with which the touch detection is performed, and supplies the fixed potential Vfix to the second electrodes ELa corresponding to the first electrodes COML with which the touch detection is not performed. In this time, the gate line drive circuit 12 supplies the fixed potential Vfix to the gate lines GCL. The display device 1a can thereby perform stable touch detection and force detection without being influenced by the gate lines GCL.

As described above, the display device 1a in the second embodiment includes the display region 11a in which the pixels Pix are arrayed in the row direction (Dx direction) and the column direction (Dy direction), the gate lines GCL extending in the row direction (Dx direction) and coupled to the pixels Pix, the signal lines SGL extending in the column direction (Dy direction) and coupled to the pixels Pix, the pixel electrodes 22 provided in the pixels Pix, the first electrodes COML facing the pixel electrodes 22, the auxiliary wiring lines 50 coupled to the respective first electrodes COML, the second electrodes ELa provided in the same layer as the signal lines SGL and overlapping with the gate lines GCL, and the detection circuit 41a that detects the force applied to the display region 11a based on at least the capacitance Cf (first capacitance) generated between the second electrode ELa and the gate lines GCL.

The above-mentioned configuration provides the configuration that detects the force applied to the display surface in the display region 11a without separately providing a layer to be provided with an electrode for force detection, as in the first embodiment.

The embodiment can provide the configuration that detects the force applied to the display surface at low cost.

Third Embodiment

Figure 23:
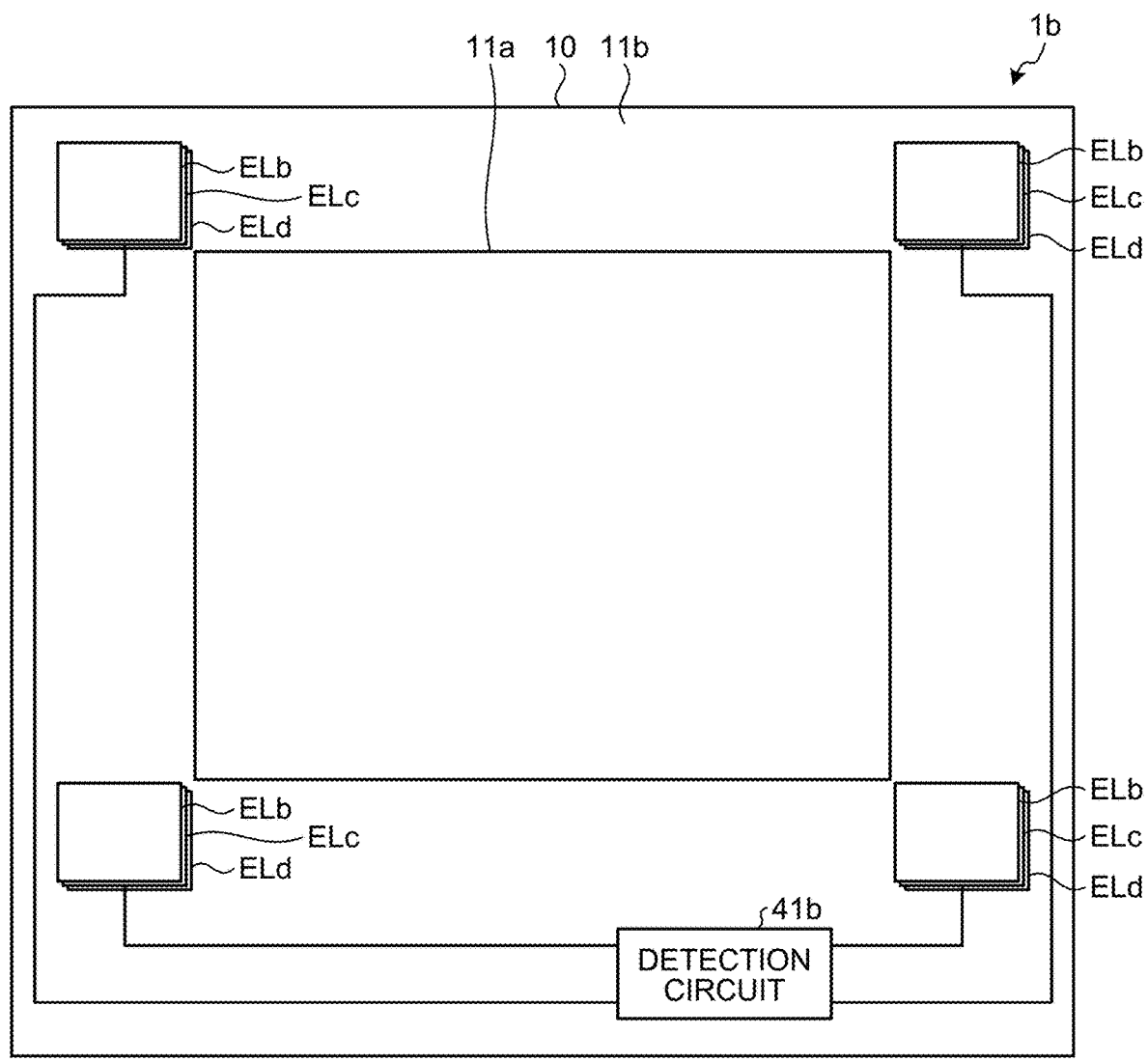
FIG. 23 is a block diagram illustrating an example of the configuration of a display device according to a third embodiment.
Figure 24:
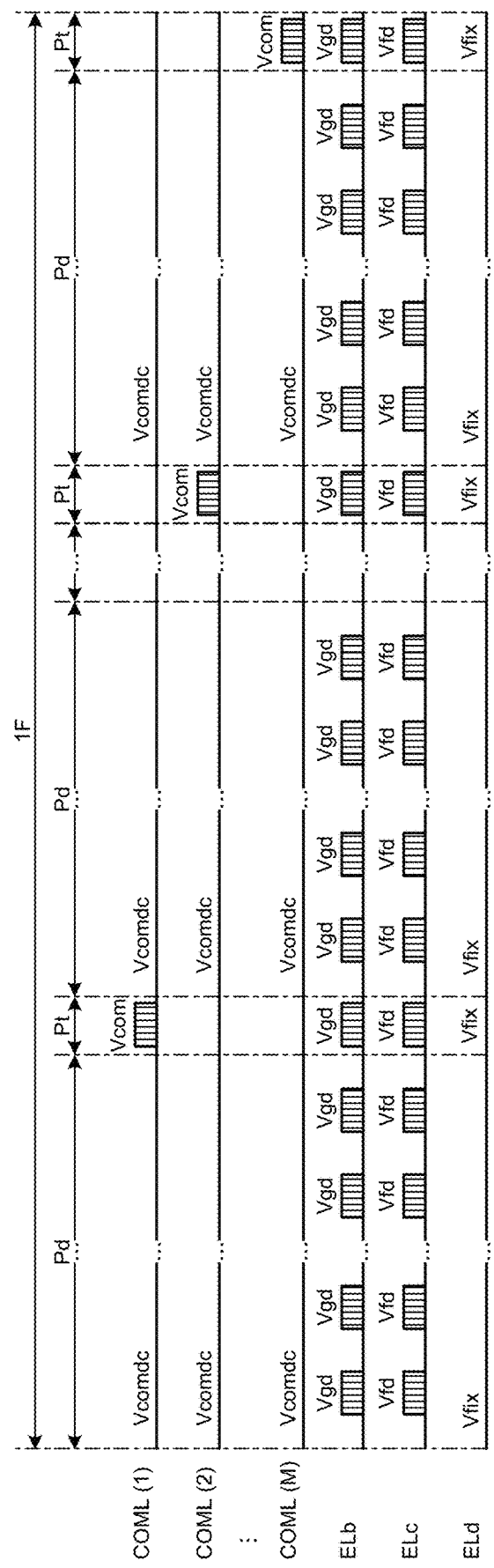
FIG. 24 is a first example of a timing chart illustrating an operation example of the display device in the third embodiment.
Figure 25:
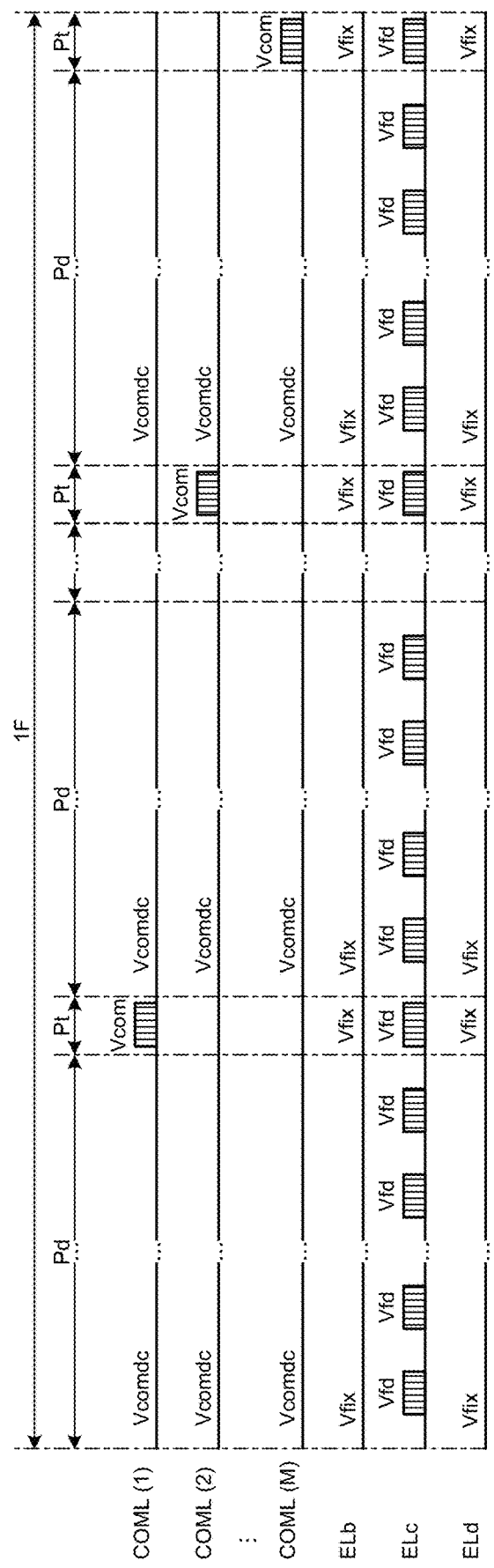
FIG. 25 is a second example of the timing chart illustrating the operation example of the display device in the third embodiment.

FIG. 23 is a block diagram illustrating an example of the configuration of a display device according to a third embodiment. FIG. 24 is a first example of a timing chart illustrating an operation example of the display device in the third embodiment. FIG. 25 is a second example of the timing chart illustrating the operation example of the display device in the third embodiment. Duplicate explanation of components that are equivalent to or the same as those described in the above-mentioned first or second embodiment is omitted.

As illustrated in FIG. 23, second electrodes ELc are provided in a frame region 11b outside the display region 11a in a display device 1b in the third embodiment. To be specific, the second electrodes ELc are provided on the outside of four corners of the display region 11a in the example illustrated in FIG. 23.

The second electrodes ELc are provided in the same layer as the signal lines SGL in the embodiment. A first reference electrode ELd is provided facing one surface of each second electrode ELc in an overlapping manner. The first reference electrodes ELd are provided in the same layer as the gate electrodes 64. A second reference electrode ELb is provided facing the other surface of each second electrode ELc in an overlapping manner. The second reference electrodes ELb are provided in the same layer as the first electrodes COML.

A detection circuit 41b performs force detection based on capacitance (first capacitance) generated between the second electrode ELc and the first reference electrode ELd in the embodiment. That is to say, the electrode E1 illustrated in FIG. 10 corresponds to the first reference electrode ELd. The electrode E2 illustrated in FIG. 10 corresponds to the second electrode ELc. The distance t between the electrode E1 and the electrode E2 illustrated in FIG. 10 corresponds to the thickness of the insulating layer 58c.

The detection circuit 41b can thereby perform force detection at desired timing without providing a force detection period. In the example illustrated in FIG. 23, the detection circuit 41b supplies the force detection signal Vfd to the second electrodes ELc, supplies the guard signal Vgd to the first reference electrodes ELd, and supplies the fixed potential Vfix to the second reference electrodes ELb as illustrated in FIG. 24.

The force detection can also be performed based on capacitance (third capacitance) obtained by adding the capacitance (first capacitance) generated between the second electrode ELc and the first reference electrode ELd and capacitance (second capacitance) generated between the second electrode ELc and the second reference electrode ELb. In this case, the detection circuit 41b supplies the force detection signal Vfd to the second electrodes ELc and supplies the fixed potential Vfix to the first reference electrodes ELd and the second reference electrodes ELb as illustrated in FIG. 25.

The second electrodes ELc, the first reference electrodes ELd, and the second reference electrodes ELb are provided on the outside of the four corners of the display region 11a in the example illustrated in FIG. 23. It can be considered that the amount of deformation caused by the force applied to the display surface in the display region 11a is decreased because the second electrodes ELc are provided in the frame region 11b outside the display region 11a in the embodiment. Thus, for example, the second electrodes ELc, the first reference electrodes ELd, and the second reference electrodes ELb may further be provided along the outside of the respective sides of the display region 11a such that the capacitance is increased. The numbers of the second electrodes ELc, the first reference electrodes ELd, and the second reference electrodes ELb do not limit the present disclosure.

When the force detection is performed based on the capacitance (first capacitance) generated between the second electrode ELc and the first reference electrode ELd, the second reference electrodes ELb are not necessarily included. The second reference electrodes ELb may be provided in the same layer as the auxiliary wiring lines 50. The second electrodes ELc may be provided in the same layer as the auxiliary wiring lines 50. In this case, the first reference electrodes ELd may be provided in the same layer as the signal lines SGL.

As described above, the display device 1b in the third embodiment includes the display region 11a in which the pixels Pix are arrayed in the row direction (Dx direction) and the column direction (Dy direction), the gate lines GCL extending in the row direction (Dx direction) and coupled to the pixels Pix, the signal lines SGL extending in the column direction (Dy direction) and coupled to the pixels Pix, the pixel electrodes 22 provided in the pixels Pix, the first electrodes COML facing the pixel electrodes 22, the auxiliary wiring lines 50 coupled to the respective first electrodes COML, the second electrodes ELc provided in the frame region 11b on the outside of the display region 11a, the first reference electrodes ELd each of which is provided in the frame region 11b and arranged so as to face one surface of the second electrode, and the detection circuit 41b that detects the force applied to the display region 11a based on at least the capacitance Cf (first capacitance) generated between the second electrode ELc and the first reference electrode ELd.

The above-mentioned configuration provides the configuration that detects the force applied to the display surface in the display region 11a without separately providing a layer to be provided with an electrode for force detection, as in the first and second embodiments.

Detection of the force using the capacitance (third capacitance) obtained by adding the capacitance (first capacitance) generated between the second electrode ELc and the first reference electrode ELd and the capacitance (second capacitance) generated between the second electrode ELc and the second reference electrode ELb is performed, whereby the detection accuracy of the force applied to the display surface in the display region 11a can be enhanced as in the first embodiment.

The embodiment can provide the configuration that detects the force applied to the display surface at low cost.

Although the preferred embodiments of the present disclosure have been described above, the present disclosure is not limited by these embodiments. Contents disclosed in the embodiments are merely examples, and various modifications can be made in a range without departing from the gist of the present disclosure. Although, for example, the liquid crystal display device capable of achieving color display has been described in the first embodiment, the present disclosure is not limited to the liquid crystal display device capable of achieving color display and may be a liquid crystal display device enabling monochromatic display. It is needless to say that appropriate modifications in a range without departing from the gist of the present disclosure also belong to the technical range of the present disclosure.

A display device according to the present disclosure can employ the following aspects, for example.

(1) A display device comprising:
a display region in which a plurality of pixels are arrayed in a row direction and a column direction;
a plurality of gate lines extending in the row direction and coupled to the pixels;
a plurality of signal lines extending in the column direction and coupled to the pixels;
a plurality of pixel electrodes provided in the pixels;
a plurality of first electrodes facing the pixel electrodes;
a plurality of auxiliary wiring lines coupled to the respective first electrodes;
a second electrode provided in the same layer as the auxiliary wiring lines and overlapping with the signal lines; and
a detection circuit configured to detect force applied to the display region based on at least first capacitance generated between the second electrode and the signal lines.

(2) The display device according to (1), wherein the second electrode includes a plurality of branch electrodes overlapping with the respective signal lines.

(3) The display device according to (2), wherein the branch electrodes are coupled to a branch wiring line overlapping with the gate line.

(4) The display device according to any one of (1) to (3), wherein the detection circuit detects force applied to the display region based on third capacitance obtained by adding the first capacitance and second capacitance generated between the second electrode and the first electrode.

(5) A display device comprising:
a display region in which a plurality of pixels are arrayed in a row direction and a column direction;

a plurality of gate lines extending in the row direction and coupled to the pixels;

a plurality of signal lines extending in the column direction and coupled to the pixels;

a plurality of pixel electrodes provided in the pixels;

a plurality of first electrodes facing the pixel electrodes;

a plurality of auxiliary wiring lines coupled to the respective first electrodes;

a second electrode provided in the same layer as the signal lines and overlapping with the gate lines; and a detection circuit configured to detect force applied to the display region based on at least first capacitance generated between the second electrode and the gate lines.

(6) The display device according to (5), wherein the second electrode includes a plurality of branch electrodes overlapping with the respective gate lines.

(7) The display device according to (6), wherein the branch electrodes are coupled to a wiring region provided in the same layer as the auxiliary wiring lines.

(8) The display device according to (7), wherein the wiring region includes:

a plurality of first branch wiring lines that overlap with the signal lines and to which the branch electrodes are coupled; and a second branch wiring line that overlaps with the gate line and to which the first branch wiring lines are coupled.

(9) A display device comprising:

a display region in which a plurality of pixels are arrayed in a row direction and a column direction;

a plurality of gate lines extending in the row direction and coupled to the pixels;

a plurality of signal lines extending in the column direction and coupled to the pixels;

a plurality of pixel electrodes provided in the pixels;

a plurality of first electrodes facing the pixel electrodes;

a plurality of auxiliary wiring lines coupled to the respective first electrodes;

a second electrode provided in a frame region outside the display region;

a first reference electrode provided in the frame region and arranged so as to face one surface of the second electrode; and a detection circuit that detects force applied to the display region based on at least first capacitance generated between the second electrode and the first reference electrode.

(10) The display device according to (9), wherein the second electrode is provided in the same layer as the signal lines.

(11) The display device according to (9) or (10), wherein the first reference electrode is provided in the same layer as the gate lines.

(12) The display device according to any one of (9) to (11), further comprising a second reference electrode arranged so as to face the other surface of the second electrode, wherein the detection circuit detects force applied to the display region based on third capacitance obtained by adding the first capacitance and second capacitance generated between the second electrode and the second reference electrode.

(13) The display device according to Note 12, wherein the second reference electrode is provided in the same layer as the first electrodes.

(14) The display device according to any one of (1) to (13), wherein the detection circuit detects a detection target based on fourth capacitance generated between the first electrode and the detection target.

What is claimed is:

1. A display device comprising:

a display region in which a plurality of pixels are arrayed in a row direction and a column direction;

a plurality of gate lines extending in the row direction and coupled to the pixels;

a plurality of signal lines extending in the column direction and coupled to the pixels;

a plurality of pixel electrodes provided in the pixels;

a plurality of first electrodes facing the pixel electrodes;

a plurality of auxiliary wiring lines coupled to the respective first electrodes;

a second electrode provided in the same layer as the signal lines and overlapping with the gate lines, the second electrode including a plurality of branch electrodes overlapping with the respective gate lines; and a detection circuit configured to detect force applied to the display region based on at least first capacitance generated between the second electrode and the gate lines, wherein the branch electrodes are coupled to a wiring region provided in the same layer as the auxiliary wiring lines, and the wiring region includes;

a plurality of first branch wiring lines that overlap with the signal lines and to which the branch electrodes a coupled; and a second branch wiring line that overlaps with the gate line and to which the first branch wiring lines are coupled.

2. The display device according to claim 1, wherein the detection circuit detects a detection target based on second capacitance generated between the first electrode and the detection target.

3. A display device comprising:

a display region in which a plurality of pixels are arrayed in a row direction and a column direction;

a plurality of gate lines extending in the row direction and coupled to the pixels;

a plurality of signal lines extending in the column direction and coupled to the pixels;

a plurality of pixel electrodes provided in the pixels;

a plurality of first electrodes facing the pixel electrodes;

a plurality of auxiliary wiring lines coupled to the respective first electrodes;

a second electrode provided in a frame region outside the display region;

a first reference electrode provided in the frame region and arranged so as to face one surface of the second electrode;

a detection circuit that detects force applied to the display region based on at least first capacitance generated between the second electrode and the first reference electrode; and a second reference electrode arranged so as to face the other surface of the second electrode, wherein the detection circuit detects force applied to the display region based on third capacitance obtained by adding the first capacitance and second capacitance generated between the second electrode and the second reference electrode.

4. The display device according to claim 3, wherein the second electrode is provided in the same layer as the signal lines.

5. The display device according to claim 3, wherein the first reference electrode is provided in the same layer as the gate lines.

6. The display device according to claim 3, wherein the second reference electrode is provided in the same layer as the first electrodes.

7. The display device according to claim 3, wherein the detection circuit detects a detection target based on fourth capacitance generated between the first electrode and the detection target.

\* \* \* \* \*